United States Patent
Kaur et al.

(10) Patent No.: US 9,306,719 B2
(45) Date of Patent: Apr. 5, 2016

(54) ADAPTIVE SCHEDULING AND HARQ MANAGEMENT FOR COOPERATIVE TRANSMISSIONS

(75) Inventors: Samian J. Kaur, Plymouth Meeting, PA (US); Tao Deng, Roslyn, NY (US); Sana Sfar, Redmond, WA (US); Kiran K. Vanganuru, King of Prussia, PA (US); Gregory S. Sternberg, Mt. Laurel, NJ (US); Matthew G. Puzio, Bay Shore, NY (US); Philip J. Pietraski, Huntington Station, NY (US); Ravikumar V. Pragada, Collegeville, PA (US); Balaji Raghothaman, Chester Springs, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 224 days.

(21) Appl. No.: 13/639,083

(22) PCT Filed: Apr. 1, 2011

(86) PCT No.: PCT/US2011/030986
§ 371 (c)(1),
(2), (4) Date: Jan. 20, 2014

(87) PCT Pub. No.: WO2011/123809
PCT Pub. Date: Oct. 6, 2011

(65) Prior Publication Data
US 2014/0241254 A1  Aug. 28, 2014

Related U.S. Application Data

(60) Provisional application No. 61/320,379, filed on Apr. 2, 2010.

(51) Int. Cl.
H04L 5/00 (2006.01)
H04L 1/18 (2006.01)
(Continued)

(52) U.S. Cl.
CPC ............ H04L 5/0053 (2013.01); H04L 1/1812 (2013.01); H04L 1/1822 (2013.01); H04L 1/1825 (2013.01); H04W 76/023 (2013.01); H04W 88/04 (2013.01)

(58) Field of Classification Search
CPC ........................... H04L 5/0053; H04L 1/1812
See application file for complete search history.

(56) References Cited

U.S. PATENT DOCUMENTS 7,224,954 B2    5/2007   Okajima et al.
2008/0009243 A1*  1/2008   Hart ............................ 455/67.13
(Continued)

FOREIGN PATENT DOCUMENTS

JP    2001-189971 A    7/2001
WO   WO 2008/156414 A2   12/2008
(Continued)

OTHER PUBLICATIONS

ZTE, R1-091711, May 8, 2009.*
(Continued)

*Primary Examiner* — Jae Y Lee
(74) *Attorney, Agent, or Firm* — Condo Roccia Koptiw LLP

(57) ABSTRACT

Disclosed herein is HARQ management, scheduling, and measurements, among other things, for cooperative communication. For example, methods herein may be used in situations wherein relaying or helping mechanisms may comprise the use of a relay node which is part of a fixed infrastructure or a relay node which may be a mobile wireless transmit/receive unit (WTRU). In said situations, a first transmission with first data is established between an evolved NodeB (eNB) and a WTRU. A second transmission with second data is established between a relay node (RN) and the WTRU. Said first and second data are combined for decoding. A single HARQ feedback for said first and second transmissions is sent from the WTRU to the eNB.

14 Claims, 22 Drawing Sheets

(51) Int. Cl.
*H04W 76/02* (2009.01)
*H04W 88/04* (2009.01)

(56) References Cited

U.S. PATENT DOCUMENTS

2009/0092073 A1    4/2009   Doppler et al.
2011/0103269 A1*   5/2011   Zheng .......................... 370/279

FOREIGN PATENT DOCUMENTS

WO    WO 2009/154540  A1    12/2009
WO    WO 2011/063244  A2    5/2011

OTHER PUBLICATIONS

Nortel, R1-082517, Jul. 4, 2008.*
ZTE, R1-091710, May 8, 2009.*
3GPP TR 36.814 v9.0.0 Mar. 2010.*
3GPP TR 36.912 v9.2.0, Mar. 2010.*
3rd Generation Partnership Project (3GPP), R1-091423, "Comparison of Type 1 Relay and L2 Cooperative Relay", ZTE, TSG-RAN WG1 #56bis, Seoul, Korea, Mar. 23-27, 2009, 10 pages.
3rd Generation Partnership Project (3GPP), R1-093816, "Type 2 Relay Transmission Modes and Subframe Structure", ZTE, Oct. 2009, 22 pages.
3rd Generation Partnership Project (3GPP), R1-100541, "Discussion on Type II Relay HARQ Issues", TSG-RAN WG1 # 59bis, ZTE, Valencia, Spain, Jan. 2010, 9 pages.
3rd Generation Partnership Project (3GPP), R2-083214, "HARQ Association for DL Semi-Persistent Scheduling", ZTE, 3GPP TSG-RAN WG2#62bis, Warsaw, Poland, Jun. 30-Jul. 4, 2008, 3 pages.

* cited by examiner

ADAPTIVE SCHEDULING AND HARQ MANAGEMENT FOR COOPERATIVE TRANSMISSIONS

CROSS REFERENCE TO RELATED APPLICATIONS

This application is the 35 U.S.C. §371 National Stage of Patent Cooperation Treaty Application No. PCT/US2011/030986, filed Apr. 1, 2011, which claims the benefit of U.S. provisional application No. 61/320,379 filed on Apr. 2, 2010, the contents of which are hereby incorporated by reference herein, for all purposes.

BACKGROUND

Wireless networks may use an automatic repeat request protocol to control errors in transmission. For example, the Long Term Evolution (LTE) network may use the Hybrid Adaptive Repeat Request (HARQ) protocol, in the uplink and/or the downlink.

The LTE downlink HARQ mechanism uses an asynchronous HARQ protocol. Retransmissions in the LTE downlink HARQ mechanism may occur in the downlink cell bandwidth. Retransmissions may often be on the same HARQ as the initial transmission after the initial unsuccessful transmission. Retransmissions may be scheduled on a particular HARQ similar to the initial transmission.

The LTE uplink HARQ mechanism may include a synchronous HARQ protocol. In this protocol, the time instance of a retransmission may be fixed with respect to the initial transmission.

SUMMARY

Herein is a framework that may support cooperative communication using different relaying mechanisms, for example. The framework may include methods of HARQ management, scheduling, and measurements for cooperative communication. For example, relaying or helping mechanisms may comprise amplify-and-forward, decode-and-forward, compress-and-forward, denoise-and-forward or some combination therein may be used.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

A more detailed understanding may be had from the following description, given by way of example in conjunction with the accompanying drawings wherein.

DETAILED DESCRIPTION

Figure 1A:
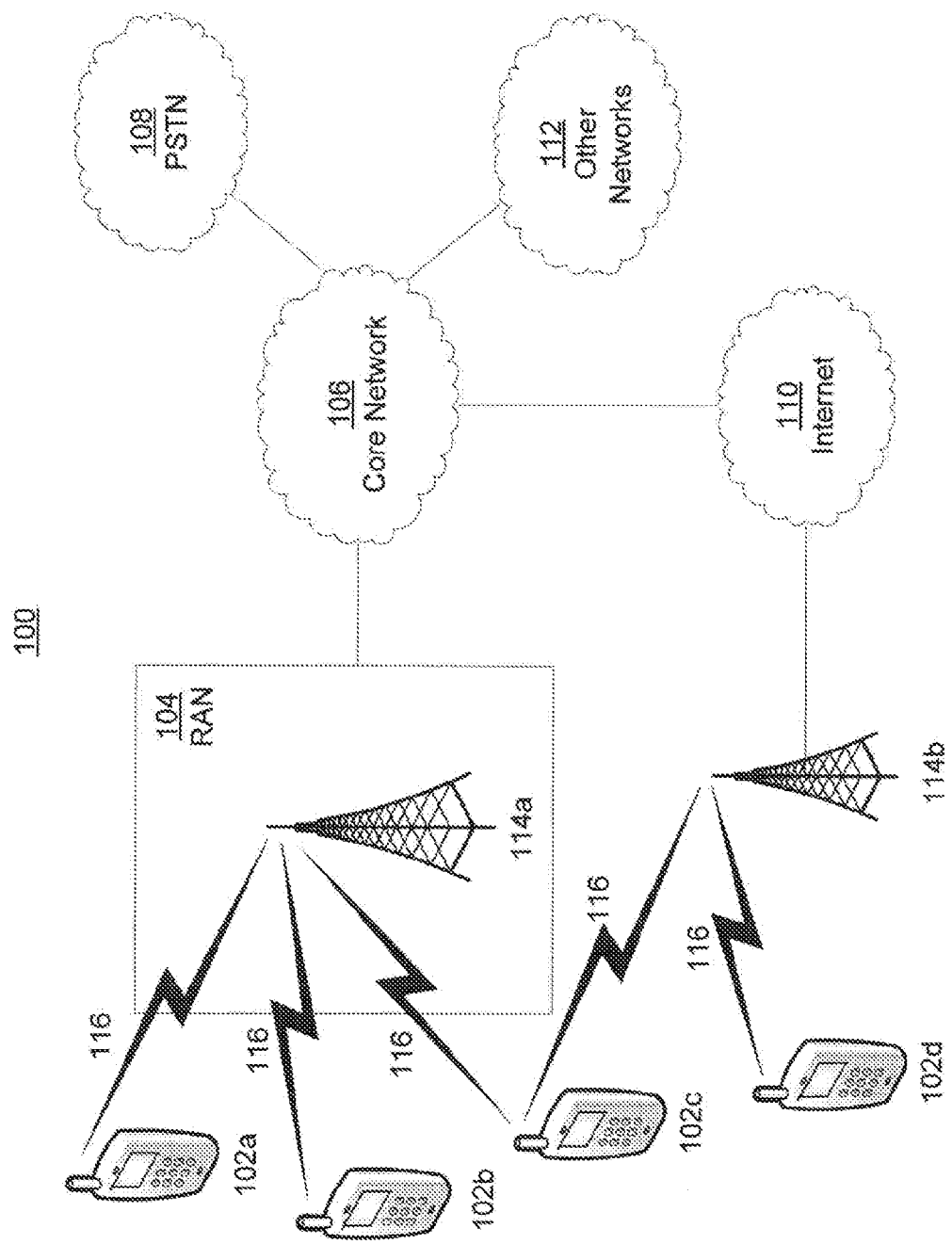
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
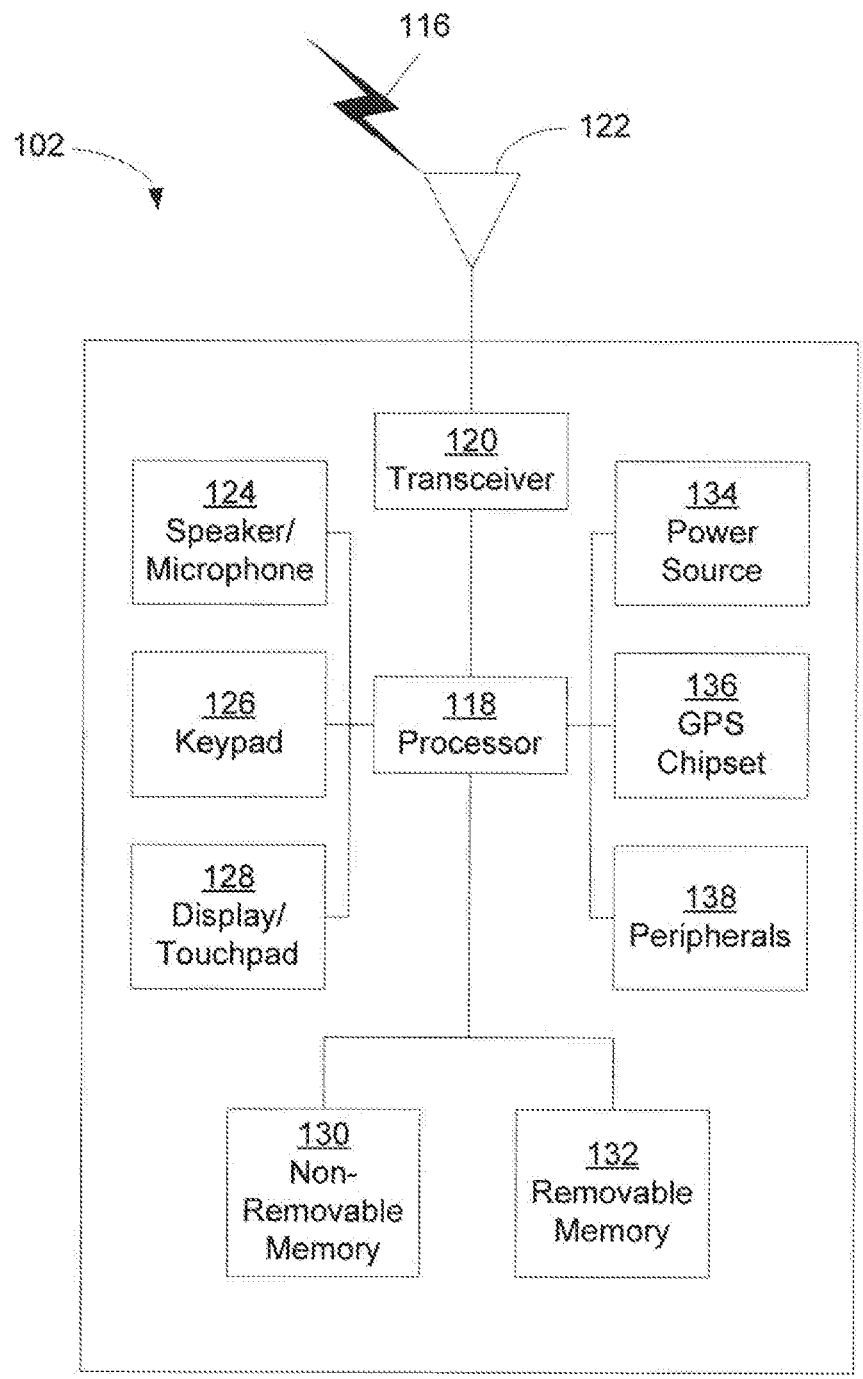
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
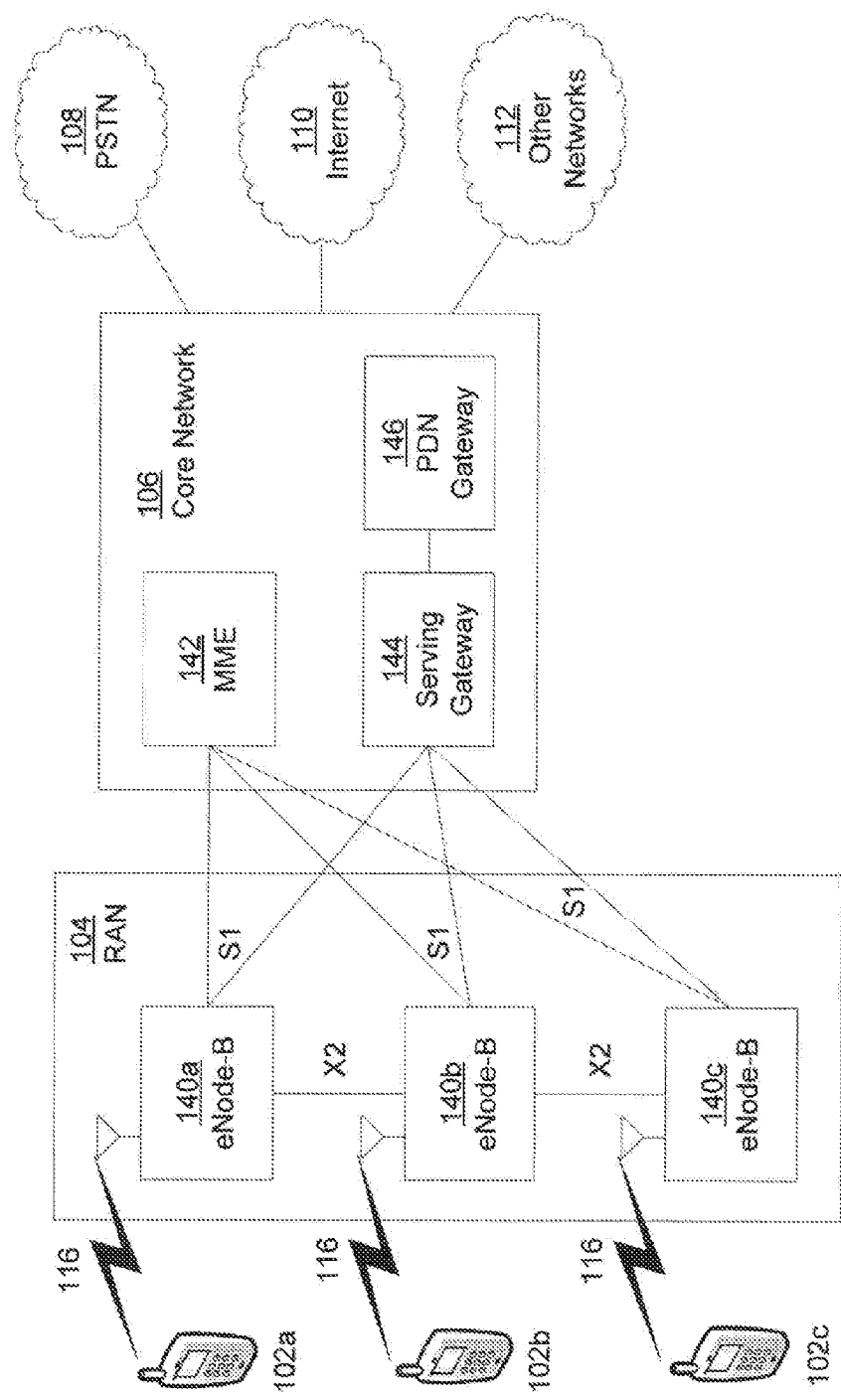
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface. The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Cooperative transmission between a donor cell and a relay may improve link and system performance in a cellular network. Cooperation may be implemented in various ways, such as network coding and transparent relay, for example. Such ways typically boost per link capacity and/or improve radio resource efficiency by utilizing the signals from a donor cell and one or more relay nodes (RNs). Relay technologies may include amplify-and-forward (A/F), decode-and-forward (D/F), compress-and-forward (C/F), and estimate-and-forward (E/F), for example.

Amplify-and-forward technology is generally referred to as a L1 or advanced L1 relay. In amplify-and-forward, a RN may amplify the received signal and forward it to the destination for coherent combining Decode-and-forward is referred to as an L2 relaying technique. To illustrate, an example L2 may relay to facilitate downlink cooperative transmission. A base station, such as an e-Node-B (eNB) for example, may send data to a RN in a first hop. The signal may also reach a wireless transmit and receive unit (WTRU), such as an user equipment (UE). The WTRU may not be able to decode the message due to insufficient signal to noise ratio. Data may be available at both the eNB and the RN at the beginning of a second hop. Then, the eNB and the RN may jointly transmit to the WTRU.

Decode-and-forward schemes generally have at least two hops. Each hop may be L2 terminated at the receiver node. Amplify-and-forward and compress-and-forward may include single hop schemes, in which the relay does not typically L2 terminate the data.

The eNB may know whether each WTRU is being served by a RN. There may be different kinds of RNs utilized in a cellular network—for example, a fixed infrastructure relay node is typically placed above the roof top so that it has a high quality channel to the eNB. In these deployments, the eNB scheduler may use a relatively high modulation and coding scheme (MCS) level and fewer resources for the relay link (eNB-RN) to maximize the overall link capacity. In another example scenario, a WTRU (e.g., a helper UE) may be utilized as a relay node, it may be below the roof top and may require lower MCS and more resources. The MCS level may be determined based on the infrastructure type (e.g., a stand-alone RN having a generally high MCS level and a RN embedded in a UE having a generally low MCS), the MCS level may be determined dynamically according to channel quality, or a combination of approaches may be used.

The benefits of decode and forward mechanisms may be more applicable to scenarios where the eNB-RN link is significantly better than the eNB-WTRU link. A better link may be needed for the RN to decode a message that a WTRU cannot decode.

Four possible network topologies illustrate how a decode-and-forward relay may help a WTRU using cooperative transmission to improve overall system capacity. For example, FIG. 2A-2D are four exemplary illustrations of decode-and-forward options. A terminal WTRU (T-WTRU) in FIG. 2A-2D is the recipient of a downlink transmission from an eNB. The RN is a cooperative node, which might be either an infrastructure node or another WTRU (e.g., helper UE).

Figure 2A:
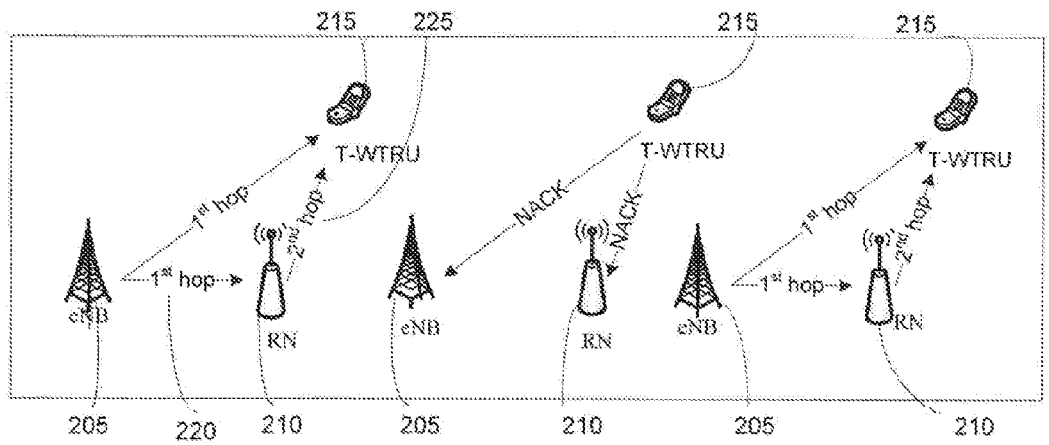
FIG. 2A illustrates an exemplary decode-and-forward helping mechanism.
Figure 2B:
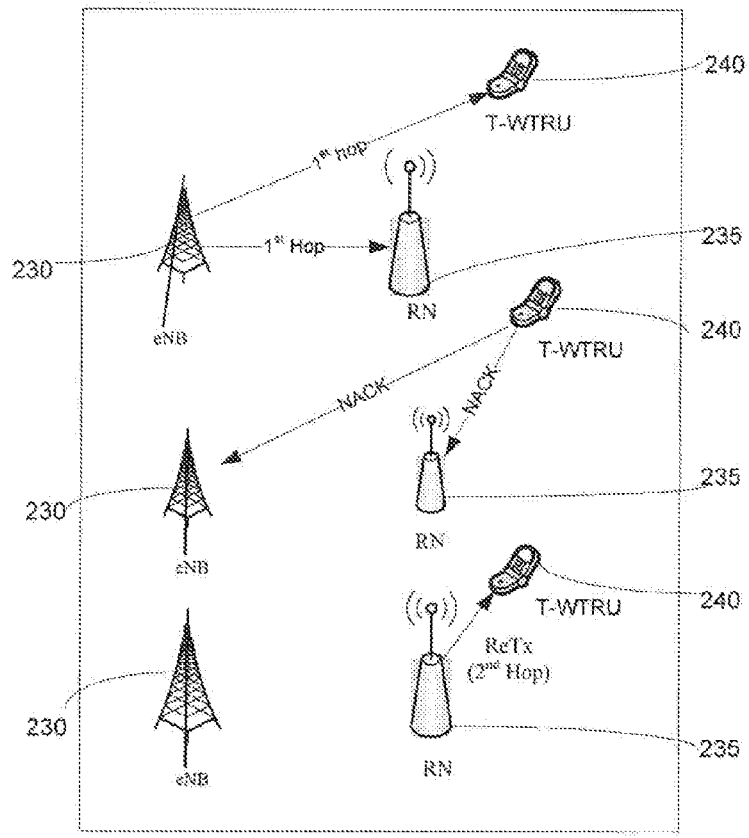
FIG. 2B illustrates an exemplary decode-and-forward helping mechanism.
Figure 2C:
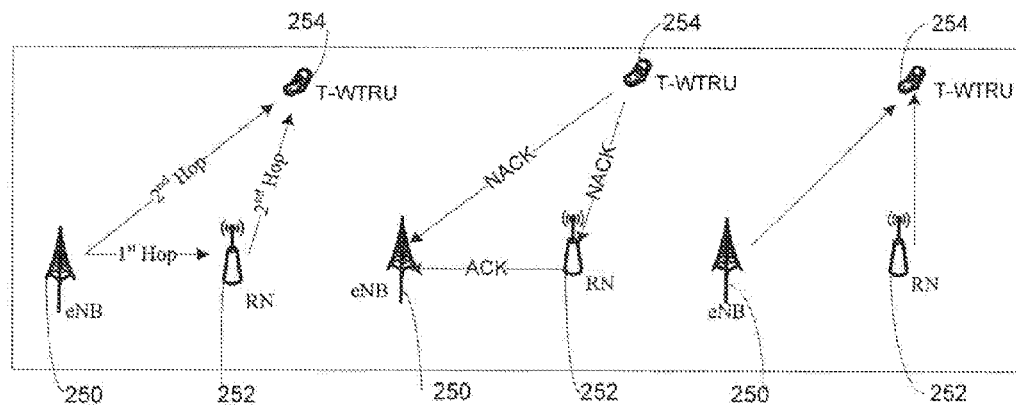
FIG. 2C illustrates an exemplary decode-and-forward helping mechanism.
Figure 2D:
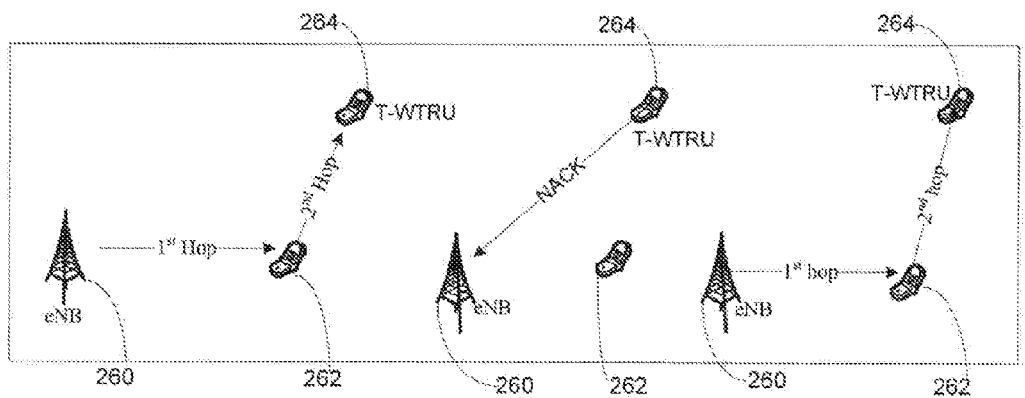
FIG. 2D illustrates an exemplary decode-and-forward helping mechanism.

In FIG. 2A, the eNB 205 may send data that is received by both the RN 210 and the T-WTRU 215. The RN 210 may also send the data received from the eNB 205 in the first hop 220 to T-WTRU 215 in the second hop 225. In FIG. 2B, the eNB 230 may send data to a RN 235 and a T-WTRU 240 in a first hop, wherein the RN 235 helps in retransmissions only. In FIG. 2C, the eNB 250 may send data to a RN 252 in the first hop, and the eNB 250 and the RN 252 may perform joint transmission to a T-WTRU 254 in the second hop. In FIG. 2D, a RN 262 (i.e., a helper WTRU or UE) may operate as a simple relay for data transmission only, for example. A T-WTRU 264 and the RN 262 may be camped on the eNB 260 and obtain control information directly from the eNB 260 on control channels on the traditional link (TRL). Herein TRL is the traditional link, which is the link between any base station (e.g., eNB) and the end user/mobile (e.g., terminal WTRU or UE).

Figure 3A:
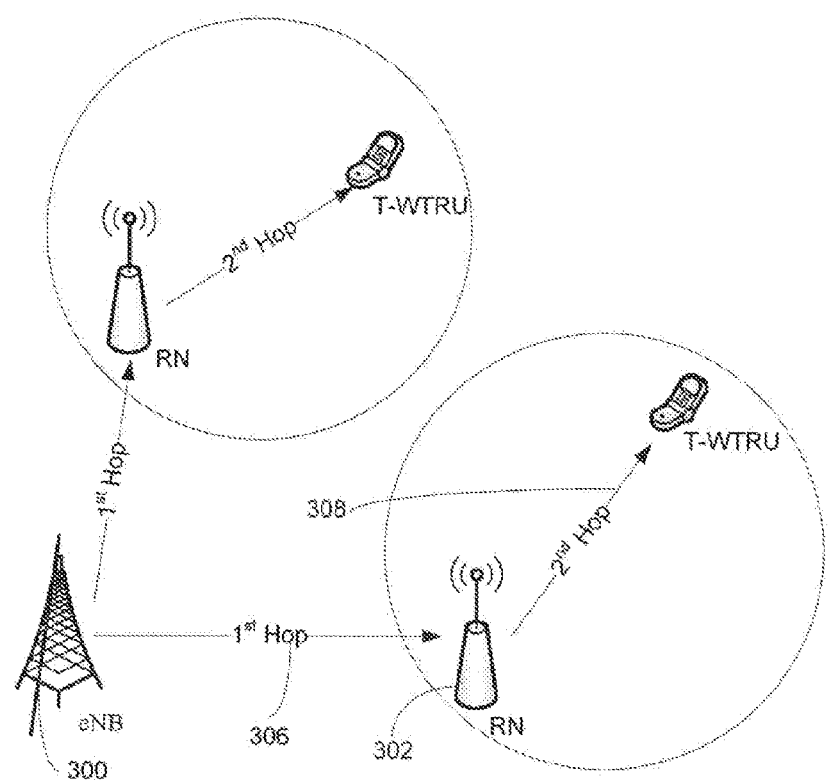
FIG. 3A illustrates an exemplary decode-and-forward helping mechanism.
Figure 3B:
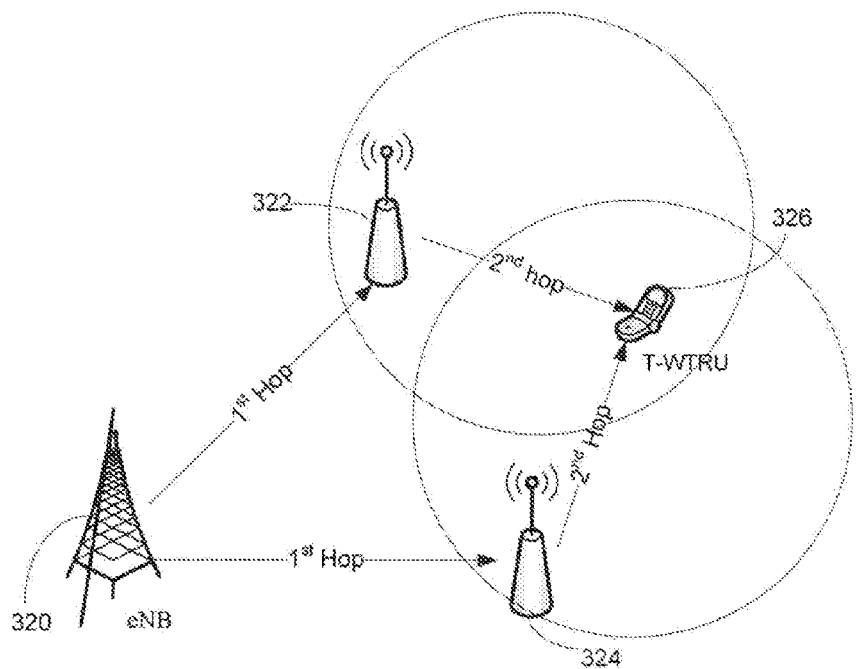
FIG. 3B illustrates an exemplary decode-and-forward helping mechanism.

FIGS. 3A and 3B are exemplary illustrations of network topologies of decode-and-forward relays which may help a WTRU to improve network coverage. In FIG. 3A, a eNB 300 may send a transport block (TB) to a RN 302 on a first hop 306. If received correctly, the RN 302 may transmit the TB on a second hop 308. In FIG. 3B, multiple RNs may participate in the (re)transmissions to the same UE 326, when the coverage areas of the RNs 322 and 324 overlap. In the first hop, the eNB 320 may send a TB to more than one RN.

Figure 4:
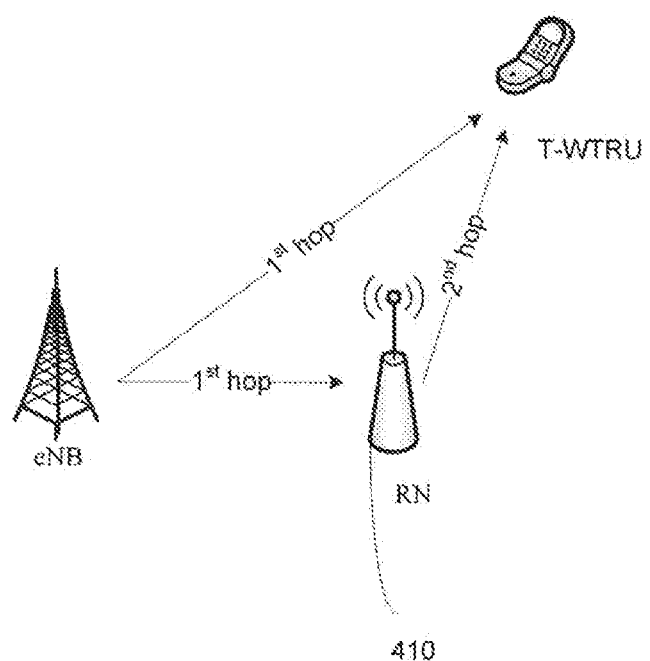
FIG. 4 illustrates an exemplary compress-and-forward relaying mechanism.

Another relaying mechanism may include the compress-and-forward relay. In compress-and-forward, the RN may receive a TB, compress the received soft information at some point before decoding, encode this information for the channel, and forward it to its destination. FIG. 4 depicts an example compress-and-forward relaying mechanism. The compress-and-forward scheme is shown as a two-hop scheme. Here, the RN 410 may not perform L2 termination. For a certain formation of relays called diamond RNs, a combination of compress-and-forward and decode-and-forward may be desirable.

Another two-step technique is Denoise-and-Forward, which is part of estimate-and-forward techniques. Denoise-and-Forward may include a technique in which the relay may uses knowledge of the modulation scheme to estimate the signal component and filter it out. The RN may then forward the signal with some amount of noise rejection.

Figure 5A:
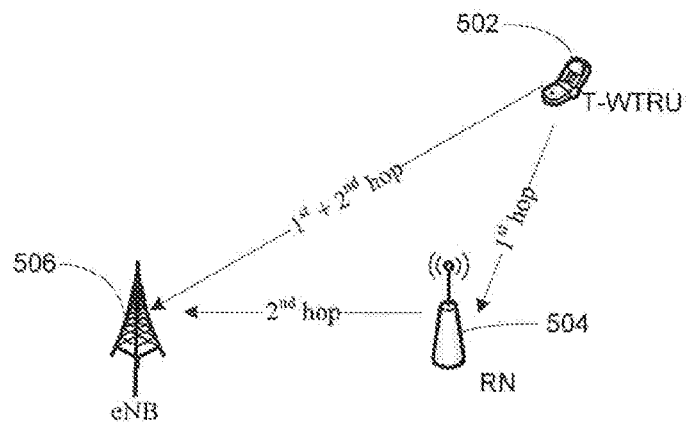
FIG. 5A illustrates an exemplary uplink helping mechanism.
Figure 5B:
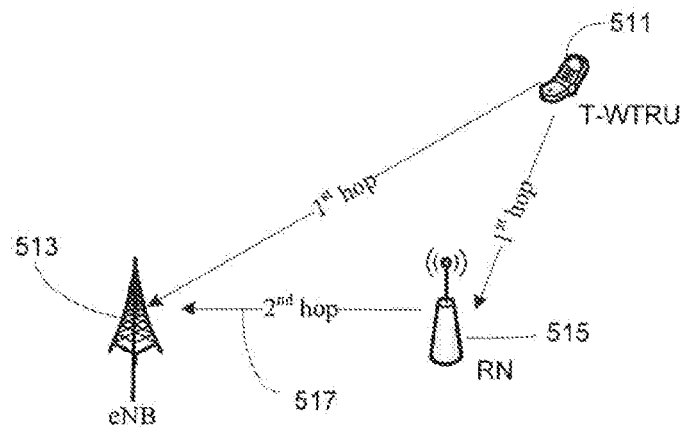
FIG. 5B illustrates an exemplary uplink helping mechanism.
Figure 5C:
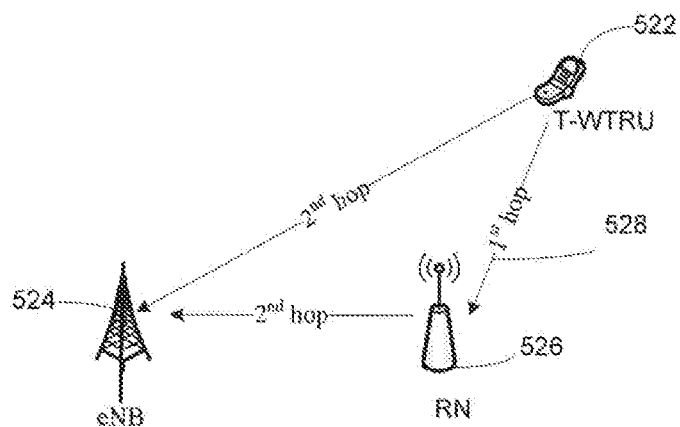
FIG. 5C illustrates an exemplary uplink helping mechanism.

Examples of uplink transmissions are shown in FIGS. 5A-5C. In FIG. 5A, the T-WTRU 502 may transmit in the 1st hop, while in the 2nd hop both the T-WTRU 502 and RN 504 transmit in joint fashion. A eNB 506 may listen to both the 1st and 2nd hop transmissions. In FIG. 5B, the T-WTRU 511 may transmit in the first hop. The RN 515 may then relay the data in the second hop 517. In both FIG. 5A and FIG. 5B, the respective eNBs may try to listen to the crosslink (XL) transmission from the respective T-WTRUs in the 1st hop, or alternately the T-WTRUs may transmit on both the traditional link (TRL) and XL. The link between a RN and a T-WTRU (e.g., H-UE-T-UE link) may be called a crosslink (XL). Transmitting on the TRL and the XL may double the TRL over the air resource requirement. In FIG. 5C, a T-WTRU 522 may transmit on a XL to a RN 526 in the 1st hop 528, followed by joint transmission by both the T-WTRU 522 and RN 526 to the eNB 524 in a 2nd hop.

A retransmission at a RN for a targeted WTRU group may be synchronized with an eNB so that the RN and eNB can coherently retransmit. There are means to address this for UL and DL respectively via additional scheduling rules.

Cooperative transmission mechanisms, such as Type 2 RN, may be a part of LTE-A relay technologies. A Type 2 relay may refer to relay technologies where the RN does not have its own physical cell Id (PCI). For example, a Type 2 Relay is an in-band relaying node that does not have a separate PCI, that is transparent to Rel-8 UEs (i.e., a Rel-8 WTRU may not be aware of the presence of a Type 2 RN), that can transmit physical downlink shared channel (PDSCH), and/or that does not transmit control information including common reference signal (CRS) and physical downlink control channel (PDCCH).

The Type 2 relay may relay information implicitly to a WTRU since the relay node does not have its own physical cell ID. The relaying device could be a WTRU, or a group of WTRUs. For a WTRU as a relay, the WTRU may not have the same restrictions as the Type 2 relay. The embodiments presented herein support both a Type 2 relay and a WTRU (e.g., UE) as a relay.

In an LTE system, for example, a PDCCH may carry a message known as downlink control information (DCI) which may include resource assignments, HARQ process id, PRB allocation, and corresponding scheduling information for a WTRU or a group of WTRUs. For resource scheduling, WTRUs may receive the control channels, (including the PDCCH) from the eNB.

In LTE, for example, physical layer retransmission combining, often referred to as hybrid automatic repeat request (HARQ) may be used. For example, HARQ may be implemented as MAC level (L1) module called HARQ entity. The HARQ entity may be associated with multiple HARQ processes. Each HARQ process may implement a corresponding stop and wait HARQ protocol. Each user may have multiple parallel stop-and-wait processes. The HARQ operations, disclosed herein, may be associated with a HARQ entity, one or more HARQ processes, and/or a combination of the HARQ entity and one or more HARQ processes.

When waiting for an ACK/NACK feedback of one process, other transport blocks may be sent using other processes. In the physical layer HARQ operation, the receiver may store packets with failed CRC checks and combine the received packet when a retransmission is received. Both soft combining and identical retransmission and combining with incremental redundancy may be facilitated.

There are several challenges in enabling L2 level cooperative relaying to improve the system capacity in an LTE based cellular system, especially if the RN is a mobile relay or other WTRU simultaneously engaged in its own data transfer sessions. The helper mechanisms that the RN employs may need to adapt to the changing channel conditions. Accordingly, mechanisms may be needed to allow an eNB to adaptively configure a RN and WTRUs to support different relay configuration types, such as those show in FIGS. 2A-2D and FIGS. 3A-3B.

Depending on a chosen helper mechanism, a RN and a WTRU may know when and how to relay a communication. For example, when a helper mechanism selected includes the compress-and-forward method, additional parameters may be provided to configure the compression efficiency, the latency of the operation at the RN and to configure the transmit time interval (TTI) at which to forward the information.

Mechanisms may be used to schedule a RN and a WTRU based on the helper mechanism selection. Two types of helper mechanisms may include one or more three-step methods related to decode-and-forward and one or more two step methods related to compress-and-forward, denoise-and-forward, and amplify-and-forward. For both helper mechanisms a eNB and a WTRU may need to coordinate the HARQ transmissions being received from two separate links. For example, if two separate HARQ entities are employed at a WTRU, one for direct transmission from an eNB and another for indirect transmission from a RN, minimal change may be done in the Layer 1 (L1) specifications and HSPA and LTE HARQ models may be used without changes. As shown herein, a scheduler can take advantage of varying radio conditions and additionally allow for combining of messages from multiple HARQ entities to increase throughput. Multiple HARQ entities may need to be coordinated and may present some challenges in terms of buffer management and coordination of HARQ processes across multiple HARQ entities.

In another option, as shown herein, a single combined HARQ entity may be used. Additional mechanisms may be incorporated when using a single combined HARQ entity to enable a WTRU to be informed on the manner to combine multiple HARQ entities and decode the data. New scheduling mechanisms may be needed to allow an eNB to signal the HARQ and timing of data from the eNB and RN.

As shown herein, measurements may be used at the eNB to monitor the RN-UE link and to facilitate adaptive selection decisions. Herein, for illustrative purposes, methods are given with regard to the framework that may support relaying using different relaying mechanisms in LTE and LTE-Advanced systems, including configuration, HARQ management, scheduling, and measurements for cooperative communication.

Figure 6:
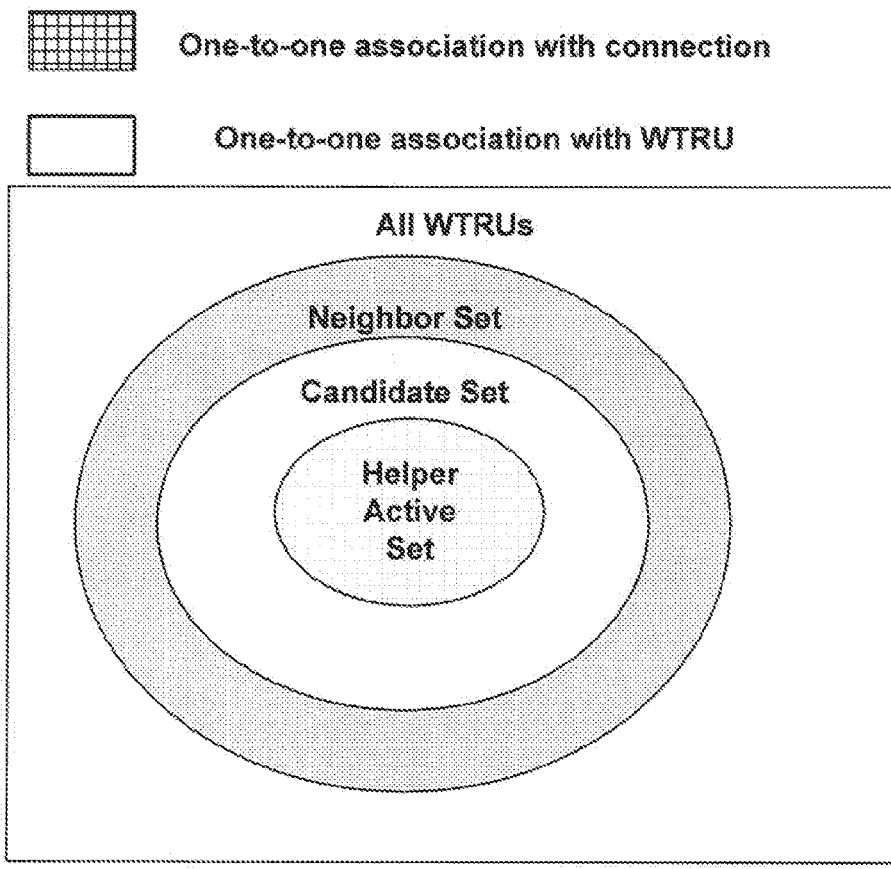
FIG. 6 illustrates an exemplary relationship among an example neighbor set, candidate set, and helper active set.

FIG. 6 is an exemplary illustration of a relationship among an example neighbor set, a candidate set, and a helper active set. As shown in FIG. 6, the Relay/helper selection mechanism may include three steps. The first step may include the selection of a relay in the neighbor set. The neighbor set may refer to the collection of neighborhood relay nodes that the T-WTRU detects during the neighbor discovery procedure. The neighbor set may be configured by the eNB, autonomously determined by the T-WTRU, or a combination of both.

The candidate set may refer to the collection of relay nodes that are suitable for helping; this is a subset of the neighbor set. In case the RN is a WTRU, the suitability may be determined from a suitability index derived from a combination of real-time data including crosslink conditions, traditional radio link conditions, battery status, hardware limitations, user subscription level, and/or willingness to help. The eNB may maintain a candidate set for each T-WTRU and may elevate a candidate to a helper active set (HAS) when a helping opportunity arises. For a given T-WTRU connection/radio bearer, the helper active set (HAS) may include the subset of the relay nodes in the candidate set that actively participate in helping the T-WTRU.

Figure 7:
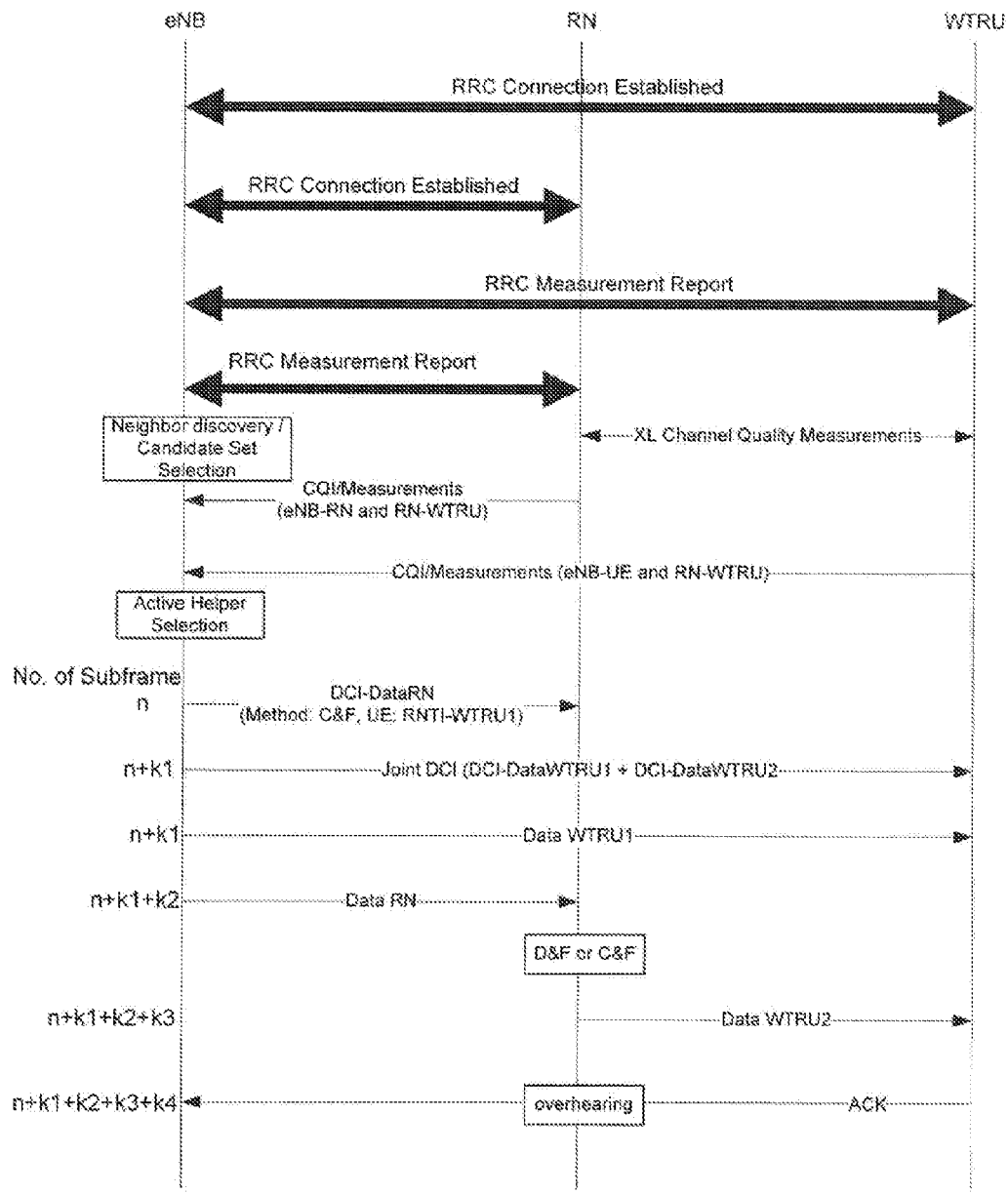
FIG. 7 illustrates an exemplary message exchange for cooperative transmission.

An eNB may make the set selection decisions based on the channel quality measurements from a relay node and/or a WTRU. FIG. 7 shows a sequence diagram explaining the timeline of the neighbor discovery, measurements and subsequent steady state signaling for scheduling to enable cooperative transmissions.

Coordinated HARQ entities and combined HARQ entity for downlink HARQ are described herein. As discussed herein, for coordinated HARQ entities a eNB may maintain multiple HARQ entities, for example, one for a RN and one for a WTRU. As discussed herein, for combined HARQ entity a eNB may maintain one HARQ entity for a RN and a WTRU.

Figure 8A:
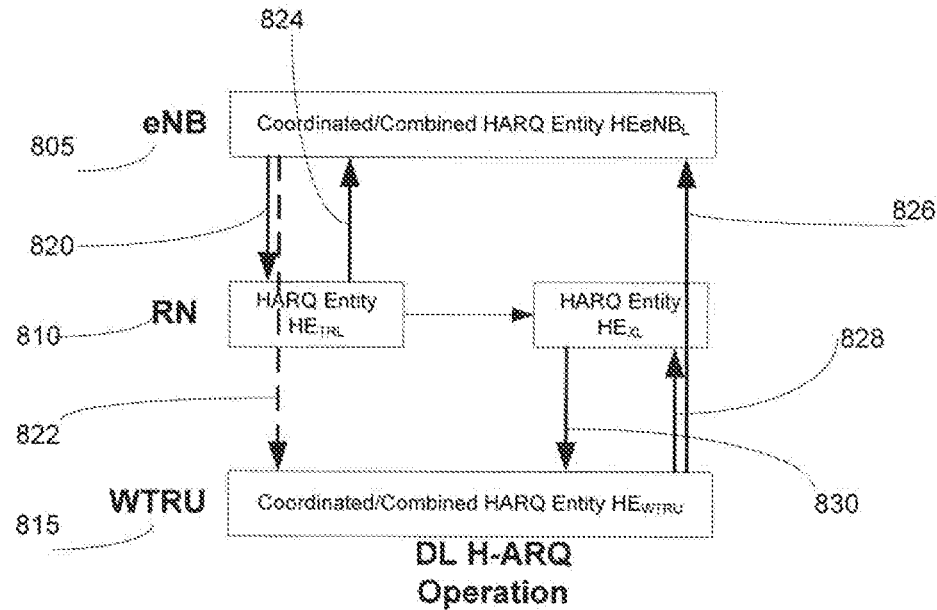
FIG. 8A illustrates an exemplary HARQ entity design.
Figure 8B:
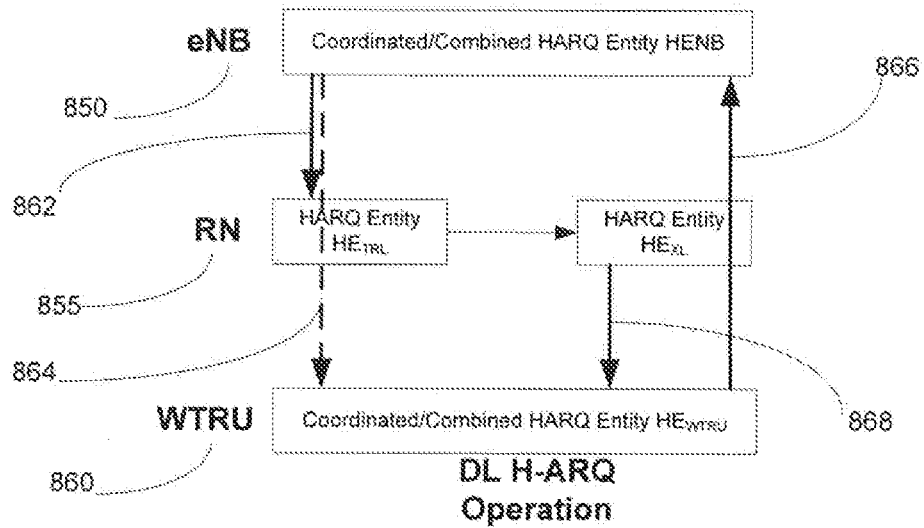
FIG. 8B illustrates an exemplary HARQ entity design.

FIG. 8A and 8B are exemplary illustrations of downlink HARQ operations. In FIGS. 8A and 8B, the eNB sends the same data to both the RN and the destination WTRU. The RN may modify the transmission slightly, for example, to remove noise or add information for scheduling, among other things. In FIG. 8A and 8B, HARQ Entity $HE_{XL}$ is used for HARQ transmissions on XL between RN and WTRU. Data transmission for HARQ processes belonging to this may start after successful reception of data on corresponding HARQ process for HARQ Entity $HE_{TRL}$. HARQ processes belonging to Coordinated/Combined HARQ Entity at WTRU may wait for subsequent transmissions on XL before sending HARQ feedback.

In FIG. 8A, a transmission destined for a WTRU 815 from an eNB 805 may be heard by a RN 810 and a WTRU 815. The solid line 820 in FIG. 8A shows that a second transmission 820 may be directed towards the RN 810 and the dotted line shows that the RN 810 may overhear the first transmission 822 from the eNB 805 that is directed to RN 815. As shown in FIG. 8A, the RN 810 may separately acknowledge (i.e., ACK/NACK) 824 the second transmission 820 from the eNB 805. If the RN 810 receives the second transmission 820 the RN may send a slightly modified version 830 of the second transmission 820 to the WTRU 815. So the WTRU 815 may get two transmissions, the first transmission 822 directly from the eNB 805 and a slightly modified version of the second transmission 830 from the RN 810. The WTRU 815 combines the two transmissions and decodes the transmission. The WTRU 815 may send an acknowledgement 828 to the RN 810 and acknowledgment 826 to the eNB 805.

In FIG. 8A, the RN 810 may explicitly transmit an ACK/NAK to the eNB 805. This approach may make the timing for the overall data transmission variable, since the timing is now dictated by two separate HARQ entities. This may need to be taken into account at the eNB when scheduling multiple HARQ processes through the same RN. A type of compress and forward where this may be necessary is where the RN takes the contents of its incremental redundancy (IR) buffer, compresses it, codes it, puts a cyclic redundancy check (CRC) on it, and transmits it. Since the IR buffer is coded, there may not be a way to directly combine with the IR buffer for the eNB process until it is decoded.

Alternatively, if a RN takes its IR buffer contents and applies an additional rate matching (puncturing or repeating soft-bit wise), the RN maps the modified IR buffer (after puncturing or repetition) directly to I/Q modulation of modulation symbols and the RN transmits that, then the T-WTRU may directly combine with the IR buffer from the eNB and a separate HARQ process for the RN may not be needed.

In FIG. 8B, the RN 855 does not acknowledge the second transmission 862 and it may be assumed that RN 855 received it. The RN 855 may send a slightly modified version 868 of the second transmission 850 if the RN 855 receives it. The WTRU 860 based on the first transmission 864 and the slightly modified version 868 of a second transmission 862, may send a final acknowledgement back to the eNB 850. In FIG. 8B, there is one acknowledgment 866. In FIG. 8A, the eNB 850 receives an acknowledgment from the RN 855 and the WTRU 860.

In FIG. 8B, the RN 855 may decode (or compress) and forward the TBs that it receives on the TRL 864, but contrary to FIG. 8A the RN 810 may not transmit an ACK/NACK back to the eNB 805. In this configuration, the round-trip time (RTT) for a HARQ process may be fixed and deterministic. There may be excess TRL resources used (when compared to FIG. 8A), since the eNB 850 has to retransmit on a NACK, even if the RN 855 has successfully decoded the data. To enable the WTRU 860 to combine data from the first hop (directly from the eNB 850) and second hop (from the RN 855), one design option is to allow the WTRU 860 to combine the two transmissions on a single HARQ process.

Figure 9A:
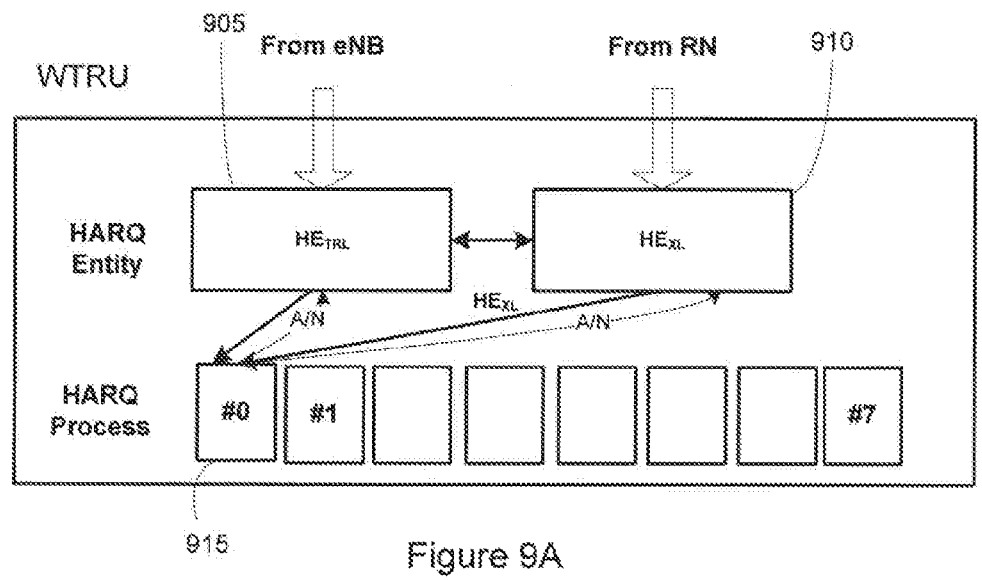
FIG. 9 illustrates an exemplary coordinated HARQ entity.
Figure 9B:
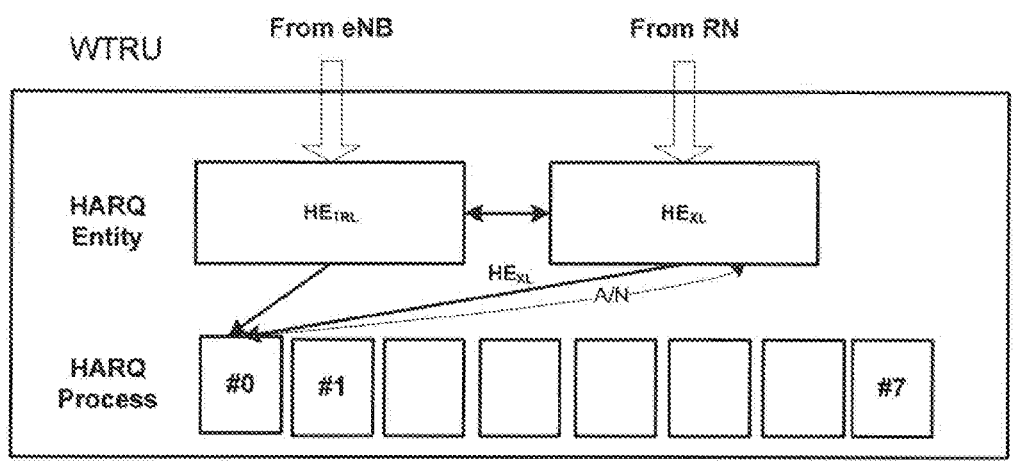

FIG. 9A, which corresponds with the transmission and ACK/NACK concept illustrated in FIG. 8A, illustrates a WTRU that may have individual HARQ entities, a HARQ entity corresponding to a transmission from an eNB and another HARQ entity for the transmission from the RN. The two HARQ entities may be coordinated and share a set of HARQ processes (including soft-buffer space). Physically, the HARQ entities may share memory, i.e., buffer space. Both the HARQ entities may operate on the same data. Here, the HARQ entities associated with the RN-WTRU link 910 and eNB-WTRU link 905 may share HARQ process #0 915 which may allow the WTRU to combine and jointly decode the separate transmissions from the eNB and from the RN. FIG. 9B displays a similar process and corresponds with the transmission and ACK/NACK concept illustrated in FIG. 8B.

In one embodiment, a set of HARQ processes in one HARQ entity may be reserved and preconfigured to be combined with HARQ processes in another HARQ entity. A WTRU may preconfigure a set of reserved HARQ processes and the mapping using a bitmask and L2 or L3 signaling or system information configuration. If a downlink assignment has been indicated for joint HARQ transmission, the received transport block may be allocated to the reserved and preconfigured HARQ process.

Figure 10A:
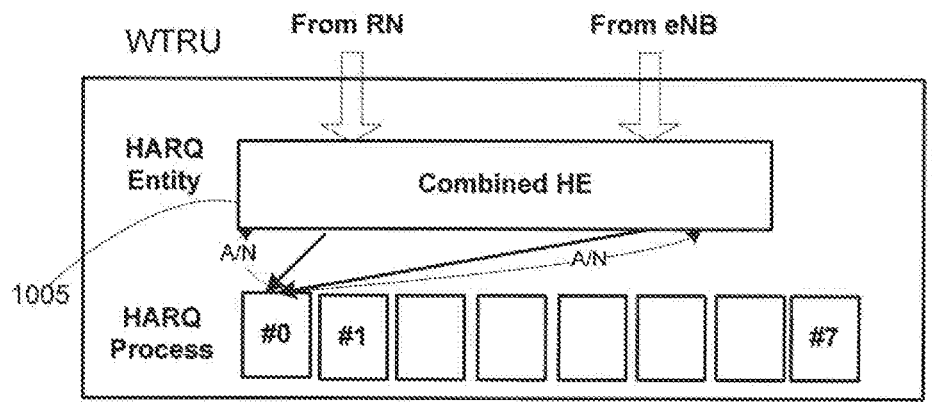
FIG. 10A illustrates an exemplary combined HARQ entity.
Figure 10B:
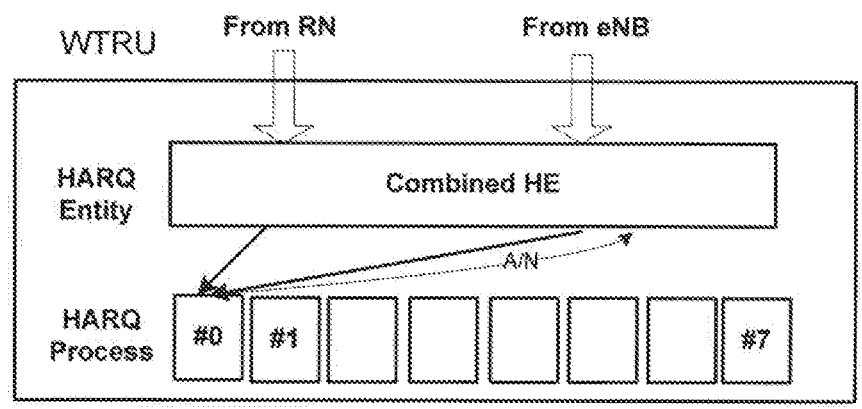
FIG. 10B illustrates an exemplary combined HARQ entity.

FIGS. 10A and 10B may correspond to the transmission and ACK/NACK concept illustrated in FIG. 8A and FIG. 8B, respectively. FIG. 10A and 10B illustrates the use of a single HARQ entity at the WTRU 1005, which spans across both the eNB-WTRU link and the RN-WTRU link. The discussion for the downlink herein is also applicable for eNB reception in UL direction. Similar sharing of H-ARQ processes between coordinated or combined HARQ entities is also applicable to eNB transmissions in DL.

Figure 11:
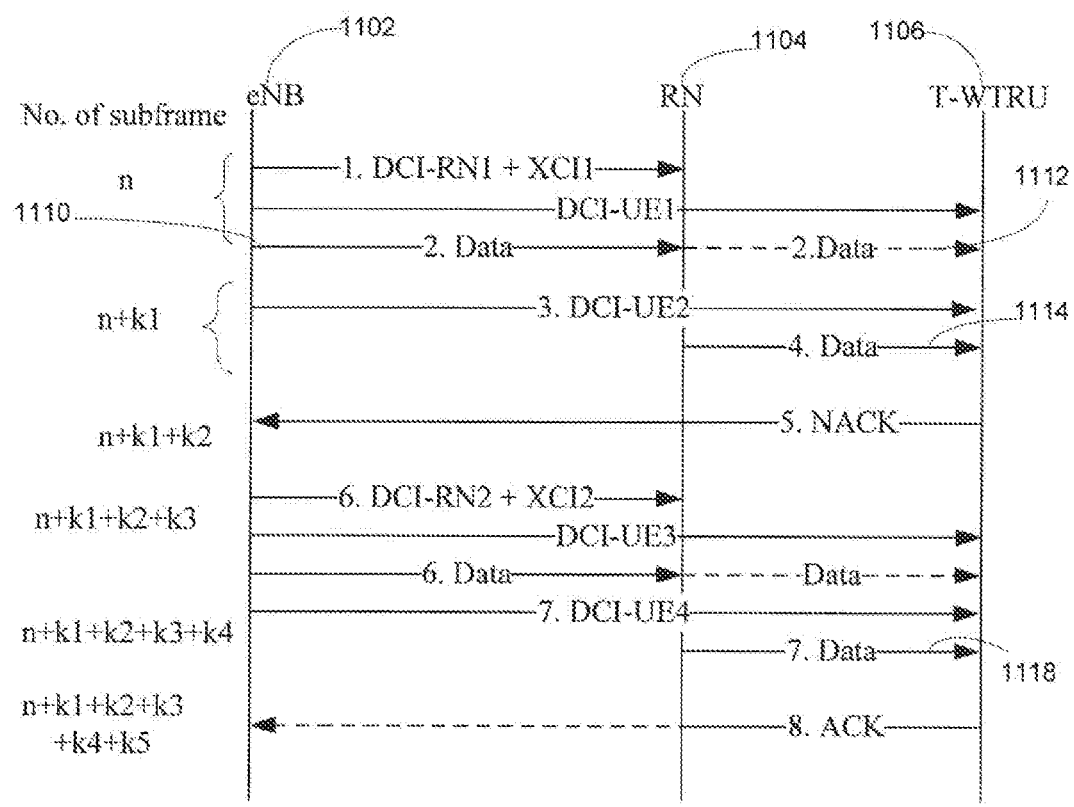
FIG. 11 illustrates an exemplary message exchange for cooperative transmission.

FIG. 11 illustrates an exemplary message exchange for HARQ transmission. Additional scheduling information formats may be used to coordinate a transmission which can be heard by multiple nodes (e.g., a RN and WTRU). A link between a RN and T-WTRU, for example, may be called the crosslink (X) and the associated scheduling information format may be called crosslink control information (XCI). An eNB may control the scheduling messages. In FIG. 11, for example, at subframe n, an eNB 1105 may send initial scheduling information. The initial scheduling information DCI-RN1 may be sent to a RN 1104 and the initial scheduling information DCI-UE1 may be sent to T-WTRU 1106. The DCI-RN1 message may comprise information for the RN 1104 with regard to how to receive initial data transmissions. The format of DCI-RN1 may extend LTE Rel-8 formats.

An eNB may send scheduling information (DCI) for a first transmission for which the eNB may send to a RN and scheduling information (XCI) for a second transmission for which a RN may transmit to a T-WTRU (XL). So in FIG. 11, DCI-RN1 and DCI-UE1 may relate to the data 1110, respectively scheduling RN 1104 and the T-WTRU 1106 to receive the data 1110. DCI-UE1 may have analogous scheduling information as DCI-RN1 which may allow the T-WTRU 1106 to overhear (as shown by the dotted line 1112) the data 1110 sent to the RN 1104. One way to allow the overhearing is to use a group radio network temporary identifier (RNTI) for all helpers (i.e., RNs) in the T-WTRU's helper active set (HAS) group, as explained herein. DCI-UE1 may additionally have information on the TTI at which the T-WTRU 1106 may expect the second transmission 1114 (from the RN 1104), so the T-WTRU 1106 has apriori information to help in coordinating and combining the first (data 1112) and the second (data 1114) transmissions.

In FIG. 11, at instant n, a scheduling message XCI1 may be sent to the RN 1104, which may provide scheduling information to be used by the RN 1104 for the second hop transmission 1114 to the T-WTRU 1106. At instant n+k1, the T-WTRU 1106 may be sent scheduling information DCI-UE2, which may carry information to help in listening and decoding the second hop communication 1114 from the RN 1104. The RN may send the second transmission 1114 to the T-WTRU 1106. Note the HARQ process information may be common in the DCI-UE1 and the DCI-UE2 messages and may indicate to the T-WTRU 1106 to jointly decode these two messages. On unsuccessful decoding, the HARQ feedback (NACK) from the T-WTRU 1106 may be sent to the eNB 1102 in n+k1+k2, and also overheard by the RN 1104.

The eNB 1102 may re-send data to the RN 1104 and T-WTRU 1106 using new DCI-RN2 and DCI-UE3. Further, XCI2 may be sent to the RN 1104, to indicate scheduling information for the second hop retransmission 1118 at instant n+k1+k2+k3+k4. At n+k1+k2+k3+k4, the RN 1104 may send a retransmission 1118 to the T-WTRU 1106. At n+k1+k2+k3+k4+k5, the HARQ feedback (i.e., ACK) from the T-WTRU 1106 may be sent to the eNB 1102, and also overheard by the RN 1104.

In another embodiment, it is possible to transmit DCI-UE1 and XCI1 to the T-WTRU 1106 in sub-frame n at the same time similar to transmitting DCI-RN1+XCI1 at the same time to RN 1104. DCI-UE2 may have similar information as XCI1, so the eNB 1102 may reduce the transmission by one compared to the aforementioned embodiment. The T-WTRU 1106 may receive the scheduling in sub-frame n and may prepare reception in sub-frame n and sub-frame n+k1 . XCI1 may have some or all the information the T-WTRU 1106 may need to get the data from the RN 1104.

FIG. 11 is an exemplary illustration of when a RN may continuously help without prompting. There are other schemes that can be used where the RN only helps when required. Here, in FIG. 11, the RN doesn't not wait for the T-WTRU to ACK/NACK to make sure the T-WTRU received the first transmission from the eNB the first time or not; the RN just helps. The RN may send the same exact data (data from the eNB for the T-WTRU) to the T-WTRU or it can send another redundancy version of the data to the T-WTRU.

An exemplary scenario where the RN may be used is where the link from an eNB to a T-WTRU (eNB-T-WTRU link) may support a low data rate transmission. A RN may be in-between the eNB and the T-WTRU and the eNB may use the RN to send more data than just a single eNB-T-WTRU link may support. Because there is an additional good link between the eNB and the RN (eNB-RN link) and also between the RN and the T-WTRU (RN-T-WTRU link). The RN may send data which may be identical or a slightly modified version. Overall the T-WTRU may get more information about the packet because of the eNB-RN and RN-T-WTRU links. FIG. 11 illustrates an exemplary message sequence chart which includes scheduling for RN functionality which may correspond with FIG. 2A.

As discussed herein with regard to FIG. 11, at subframe n and n+k1+k2+k3+k4, the eNB may send to the T-WTRU scheduling information to help in listening and decoding the messages coming from the RN. This message was called the DCI-UE, and may be addressed to the Group-RNTI associated with the T-WTRU's Helper Active Set. The DCI-UE format may carry the following information: resource allocation type; resource block assignment; modulation and coding scheme; HARQ information; number of transmission before decoding or providing feedback (e.g., an number and/or TTI offset for a second transmission); HAS RN-ID; and helping mechanism (C/F, D/F, A/F, etc.) which may include configuration parameters for the helper mechanism and type and level of compression, and the like.

Similarly, the RN may need to be provided information on how and when to perform second hop transmission using a modified DCI message, referred to as XCI. The XCI may carry the following information: TTI offset for second transmission; HARQ information for second transmission; second transmission MCS, RE allocation, and the like; and helping mechanism information (C/F, D/F, A/F, etc.). The RN may be provided scheduling information to allow it to receive the first transmission for a eNB, referred to as DCI-RN in FIG. 11. DCI-RN and DCI-UE may be sent as a single message addressed to the Group-RNTI, as discussed. The DCI-RN format may reuse common DL DCI Formats.

In different scenarios, it may be possible that a configuration for a RN may need to be sent using radio resource control (RRC) signaling. This may include: helping mode (D/F or C/F); timing delay from data reception to ACK/NACK feedback for helper mode; bitmap frame pattern indicating which sub-frames used and in which direction (e.g., DL, UL, or XL); and the IR version to be used for crosslink communication.

Once the relay selection decision is made, a framework may allow the eNB to adaptively reconfigure the relaying cooperative mechanism. The relay selection decision may be transmitted to a RN and a WTRU in the following ways: signaling at the RRC; signaling at the MAC; and signaling at the PDCCH.

Figure 12A:
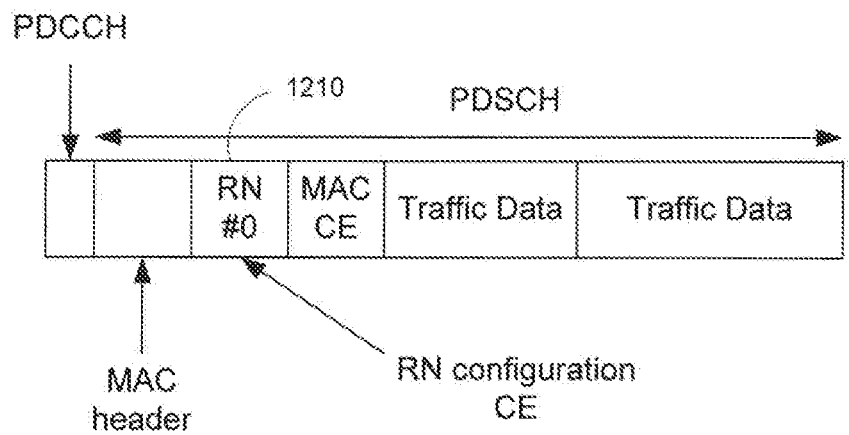
FIG. 12A illustrates an exemplary MAC control element received at a RN for a helping mechanism.
Figure 12B:
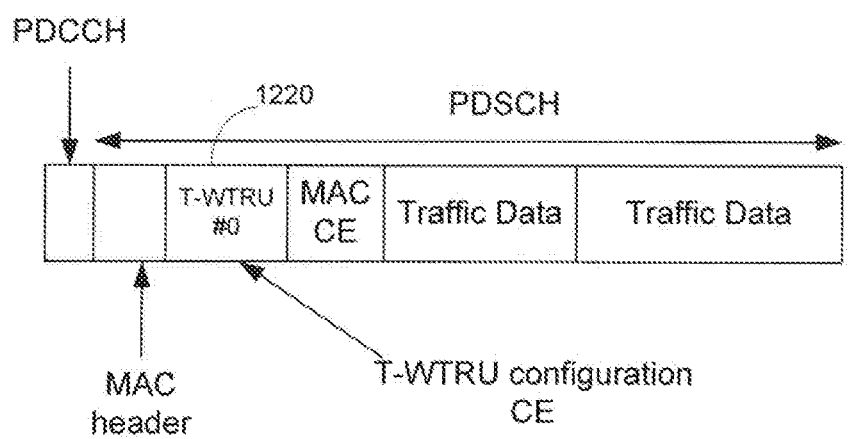
FIG. 12B illustrates an exemplary MAC control element received at a T-WTRU for a helping mechanism.

The decision on which mechanism to use may be based on the latency and reliability requirements. RRC messaging may be an extension of the RRC configuration or re-configuration message or a new message. The signaling at the MAC may be performed using MAC control elements. For example, FIGS. 12A and 12B depict example MAC control elements for RN selection and notification. The control element (CE) 1210 and 1220 for the RN could carry information including RNTI of the T-WTRU, the helper mechanism, and/or the configuration parameters for helping, such as processing latency of compress-and-forward scheme, for example. Once the RN selection decision is made, an eNB may align the PDCCH dedicated search space so the T-WTRU and its RNs are scheduled using common search space. This may reduce the amount of blind decoding done by the RNs and T-WTRUs.

For the decode-and-forward helper mechanisms, the decision regarding the scheme of helping may be sent using MAC control elements or the PDCCH. For compress-and-forward, the helper mechanism decision may be signaled at the PDCCH level. For example, the helper mechanism selection decision may include the eNB determining a helper mechanism for each link, the eNB and RN negotiating a helper mechanism selection, and/or the RN autonomously determining the helper mechanism selection.

When an eNB determines a helper mechanism for each link, the eNB may determine the helper mechanism from link measurements, for example. The eNB may inform a RN and T-WTRU which mechanism is utilized. This method may use a significant amount of control information to be available at the eNB.

When an eNB and RN negotiate a helper mechanism selection, control overhead may be reduced by sending fewer crosslink measurements to the eNB. The RN and eNB may jointly decide on the appropriate helper mechanism based on their own measurements.

When a RN autonomously determines the helper mechanism selection, a eNB may hand over the helper mechanism selection to the RN. This method may minimize the control overhead and may apply to helping mechanisms where the RN and eNB do not jointly transmit.

Dynamic scheduling is a mode of scheduling by means of downlink assignment messages for the allocation of downlink transmission resources and uplink grant messages for the allocation of uplink transmission resources; these messages may be valid for specific single subframes. The UL and DL messages may be transmitted on the PDCCH using a cell-RNTI (C-RNTI) to identify the intended T-WTRU in a cell. In order for the T-WTRU to be able to overhear the transmission sent a RN, one option may be to configure a group-RNTI for T-WTRU and some or all the RNs in the HAS group associated with the T-WTRU. This approach may make each WTRU involved in the relay operation perform PDCCH CRC de-scrambling two times. The first time a WTRU may use its own C-RNTI in case the PDCCH contains DCI/grant for traditional link and the second time the WTRU may use the group RNTI to see if there is any relay specific DCI/grant. This may be mitigated by using the group RNTI for individual transmissions as well.

Two examples with regard to how a T-WTRU may combine and decode a reception from an eNB and a RN are the following: 1) the T-WTRU may individually try to decode the message and send an A/N for the each transmission; and 2) the T-WTRU may wait to receive both the first and the second transmission, and then may try to combine and decode the MAC PDU. To enable (2), the T-WTRU may be configured to wait for two transmissions in the DCI-UE format. This may be preconfigured as TTI Bundling in the DL, where the T-WTRU may be configured to consider the data in two given non-consecutive TTIs as multiple variations of data of a single HARQ process.

Semi-static scheduling may be used, where an eNB can assign resources for HARQ retransmissions in a synchronous manner. If the eNB hears an ACK from a T-WTRU it may reuse the resources assigned for retransmission for another T-WTRU. To enable resource reuse, the retransmission from the relay node may be delayed by more than 4 TTIs after the ACK/NACK feedback is received. Referring to FIG. 11 in the context of another embodiment, XCI1 may use some type of semi-persistent scheduling or synchronous and non-adaptive scheduling, wherein the retransmission from a RN to the T-WTRU may be fixed sub-frames later and use the same frequency resource (similar to an LTE uplink retransmission). This may save the transmission of a second XCI2 and DCI-UE4, which are shown in FIG. 11.

In another embodiment, a RN may initiate assistance by requesting resources, possibly as a result of overhearing a NACK or other indication from the T-WTRU. Here, the RN may request to be scheduled for resources from a eNB. This request may be done by extending the scheduling request (SR) message to allow a request for resources for the RN-T-WTRU link. Additionally, this request might be implicitly made by sending an extended buffer status report (BSR) message with information of the buffer status for the HARQ process serving the RN-T-WTRU link.

Figure 13:
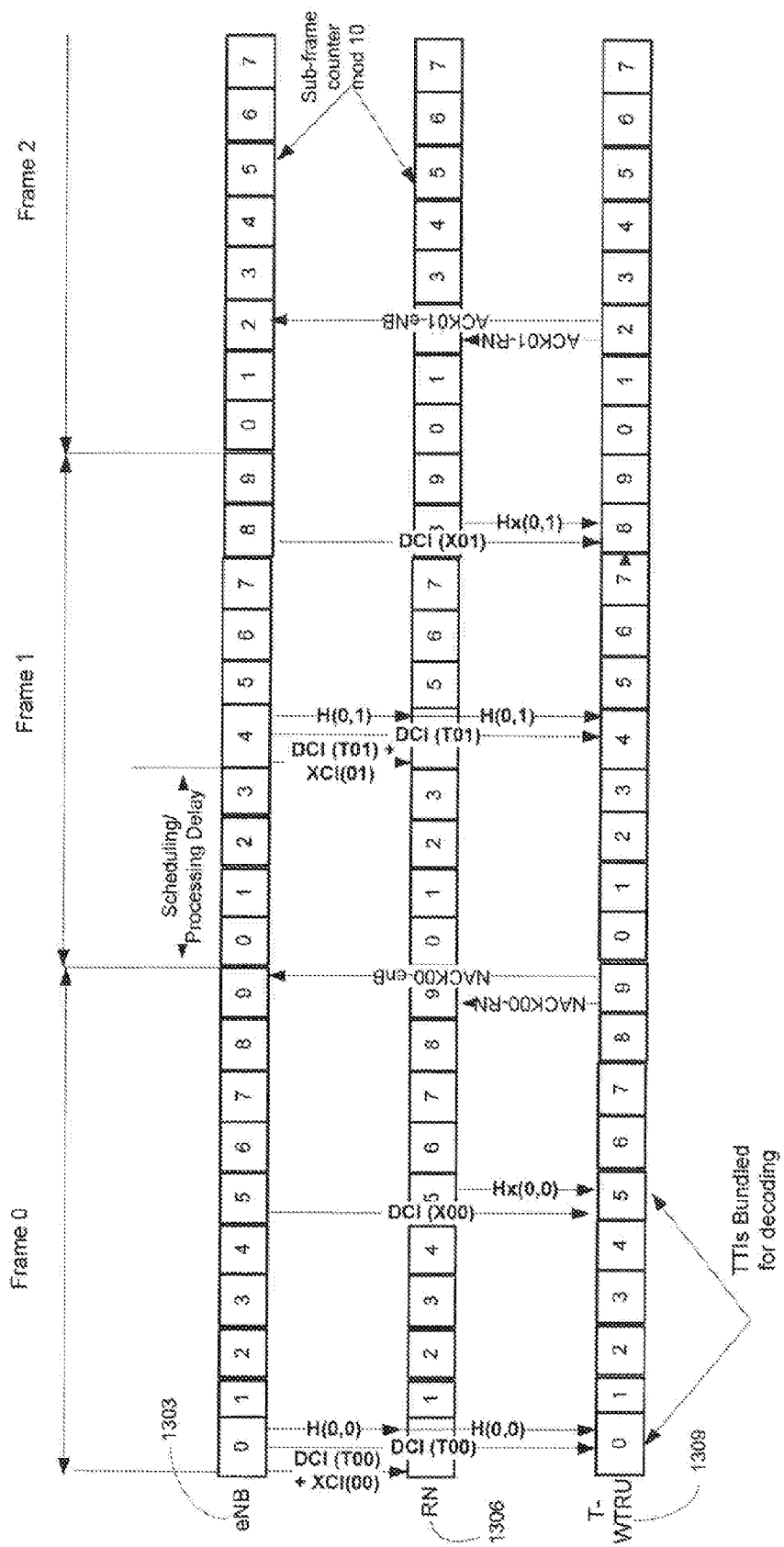
FIG. 13 illustrates an exemplary message exchange and timing for a cooperative transmission.

In the combined HARQ entity approach, a RN may decode (or compress) and forward the TBs that it receives on the TRL, but may not transmit an ACK/NACK for them. FIG. 13 is an exemplary illustration of HARQ timing with regard to FIG. 2A relay configuration with a single HARQ entity. In the figures and as discussed herein, "H" stands for data that is being transmitted. Also, herein the index pair (fi,sk) indicates frame index i, subframe index k.

In FIG. 13, in (frame0,sub-frame0) a eNB 1303 may schedule a TRL using DCI (T00) and an XCI message, XCI(00), that instructs a RN 1306 to transmit Hx(0,0) on the XL in (f0,s5). At (f0,s0), H(0,0) is transmitted from the eNB 1303 to RN 1306 and T-WTRU 1309. Resources for the XL may be scheduled irrespective of the success or failure of the RN 1306 in decoding the TRL TB H(0,0). The RN 1306 may also buffer the TRL TB H(0,0) and Chase-combine with the XL TB Hx(0,0) in (f0,s5) before decoding. The T-WTRU 1309 may provide HARQ feedback (NACK00-eNB) to the eNB 1303 in (f0,s9). If the NACK (NACK00-enB) is received, the eNB 1303 may retransmit in (f1,s4).

A T-WTRU may not decode until it receives both transmissions (TTI bundling), one from the RN and one from a eNB. For example, with FIG. 13 as a reference, the T-WTRU 1309 had received the data at (f0,s0) and (f0,s5), T-WTRU 1309 may decode after it has received and combined the contents. RTT may be fixed (actually 14 TTIs for the next transmission), and may provide predictability to the eNB scheduler.

Figure 14:
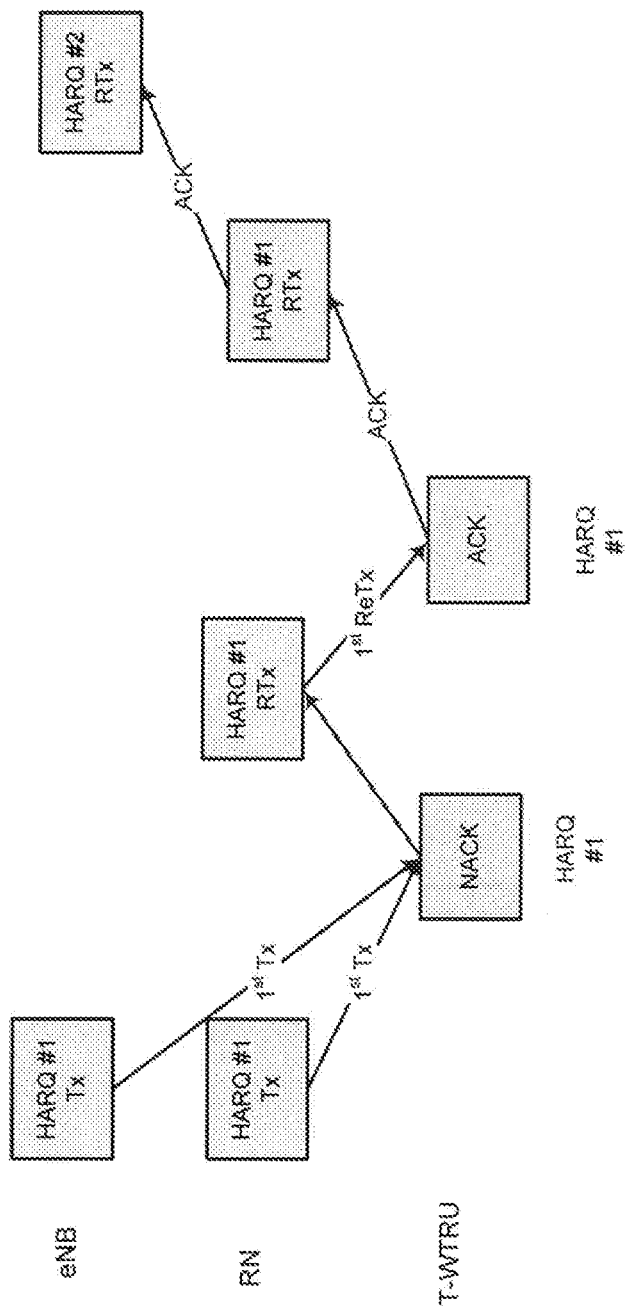
FIG. 14 illustrates an exemplary HARQ message flow.

FIG. 14 shows a HARQ process wherein the eNB may not assist the RN in some retransmissions. After the first transmission, the eNB may hand off the HARQ process to the RN. The eNB may not keep track of most of the underlying process. When the data is successfully received by the T-WTRU, the eNB may be notified by the T-WTRU and/or RN.

Figure 15:
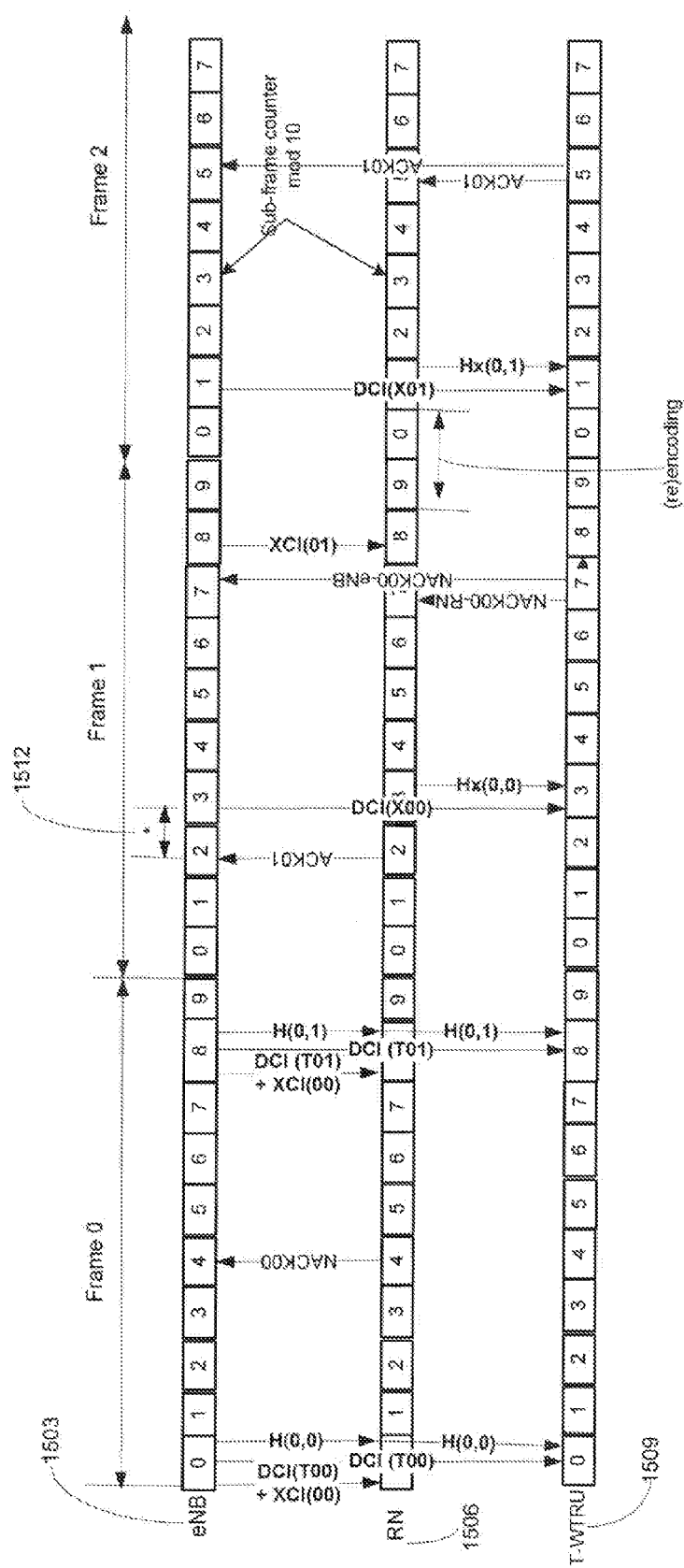
FIG. 15 illustrates an exemplary message exchange and timing for a cooperative transmission.

FIG. 15 is an exemplary illustration of a design with dual simultaneous HARQ entities at an eNB 1503. The eNB 1503 may maintain one HARQ entity with respect to the RN 1506, as conceptually shown in FIG. 8A, and another with respect to the T-WTRU 1509. In this design, the RN 1506 may explicitly transmit an ACK/NAK to the eNB 1503. FIG. 15 shows a timing diagram which may use the relay in FIG. 2A discussed in earlier sections. Herein the index pair (fi,sk) indicates frame index i, subframe index k. In FIG. 15, at (f0,s0), the eNB 1503 may schedule the TRL using DCI(T00), and also may transmit H(0,0). The eNB 1503 may also transmit XCI (00), which may instruct the RN 1506 to transmit on the XL at a certain specified future TTI with a specified resource allocation as well as a specified MCS. The XL transmission may use the same redundancy version (RV) as the current TRL transmission.

As shown in FIG. 15, the RN may receive the TRL data H(0,0), and attempt to decode it. The RN 1506 may then send a NACK (NACK00) in (f0,s4). The eNB in response may retransmit the data in (f0,s8, along with a fresh XCI(0,0) that overrides the previous XCI(0,0) transmitted at (f0,s0). As the RN 1506 is transmitting the ACK (f1,s2), the RN 1506 may simultaneously re-encode the XL. Once the TB H(0,1) is successfully received at the RN 1506, as shown by the ACK in (f1,s2), the RN 1506 may re-encode the TB Hx(0,0) and may transmit over the XL in (f1,s3 ). If the XL transmission Hx(0,0) in (f1,s3) is unsuccessful (NACKs in (f1,s7)), then the XL is rescheduled. This approach may allow the eNB 1503 to not retransmit on the TRL, hence TRL resources may be saved. In another embodiment, at * 1512 the time between the ACK01 (f1,s2) and the retransmission at (f1,s3) may be more than one frame later depending on processing time; thus in this example each transmission may be moved over by * 1512 frames.

Figure 16:
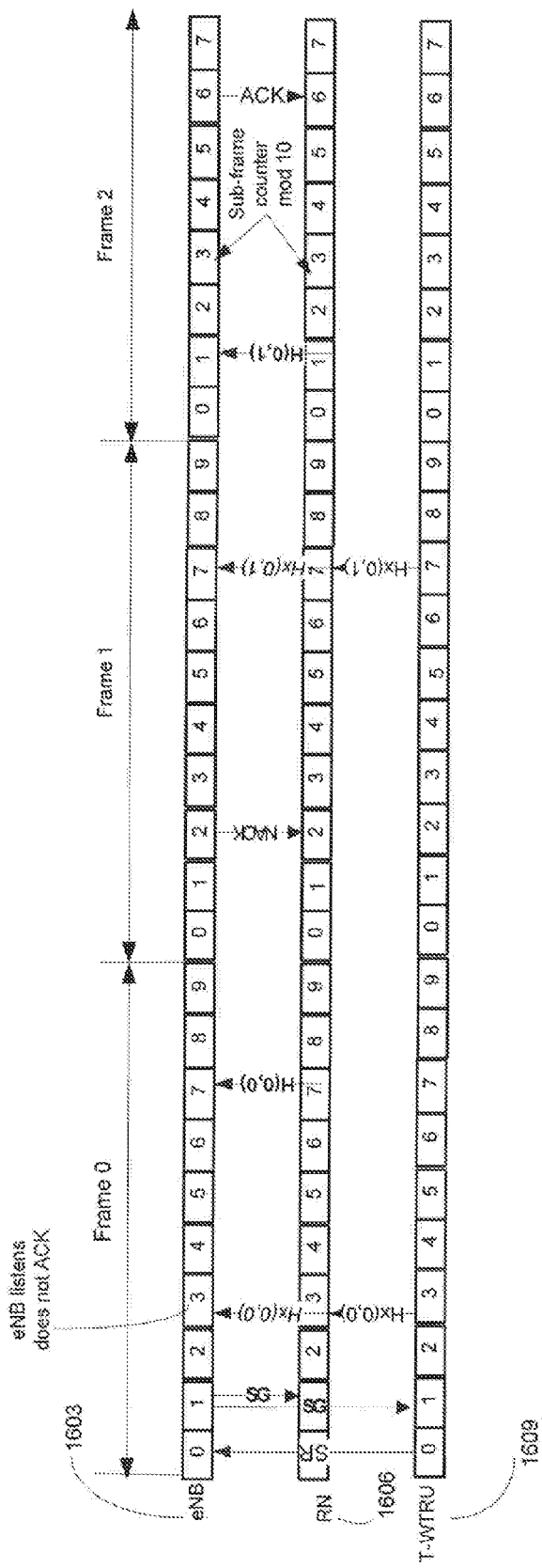
FIG. 16 illustrates an exemplary message exchange and timing for a cooperative transmission.

In a similar configuration as in FIG. 8A (downlink), FIG. 16 illustrates an exemplary timeline for uplink HARQ. In FIG. 16, the T-WTRU 1609 may make a request for resources in (f0,s0). The eNB 1603 may respond with a scheduling grant (SG) at (f0,s1) to both the T-WTRU 1609 and the RN 1606. The T-WTRU 1609 may transmit data at (f0,s3) on the XL resources. The (f0,s3) transmission may also be received by the eNB 1603. The TRL transmission from RN 1606 may occur in (f0,s7). The eNB 1603 may decode and may provide HARQ feedback (NACK) in (f1,s2). A retransmission may happen in (f1,s7). The RTT may be fixed here, and hence the HARQ may proceed synchronously.

Figure 17:
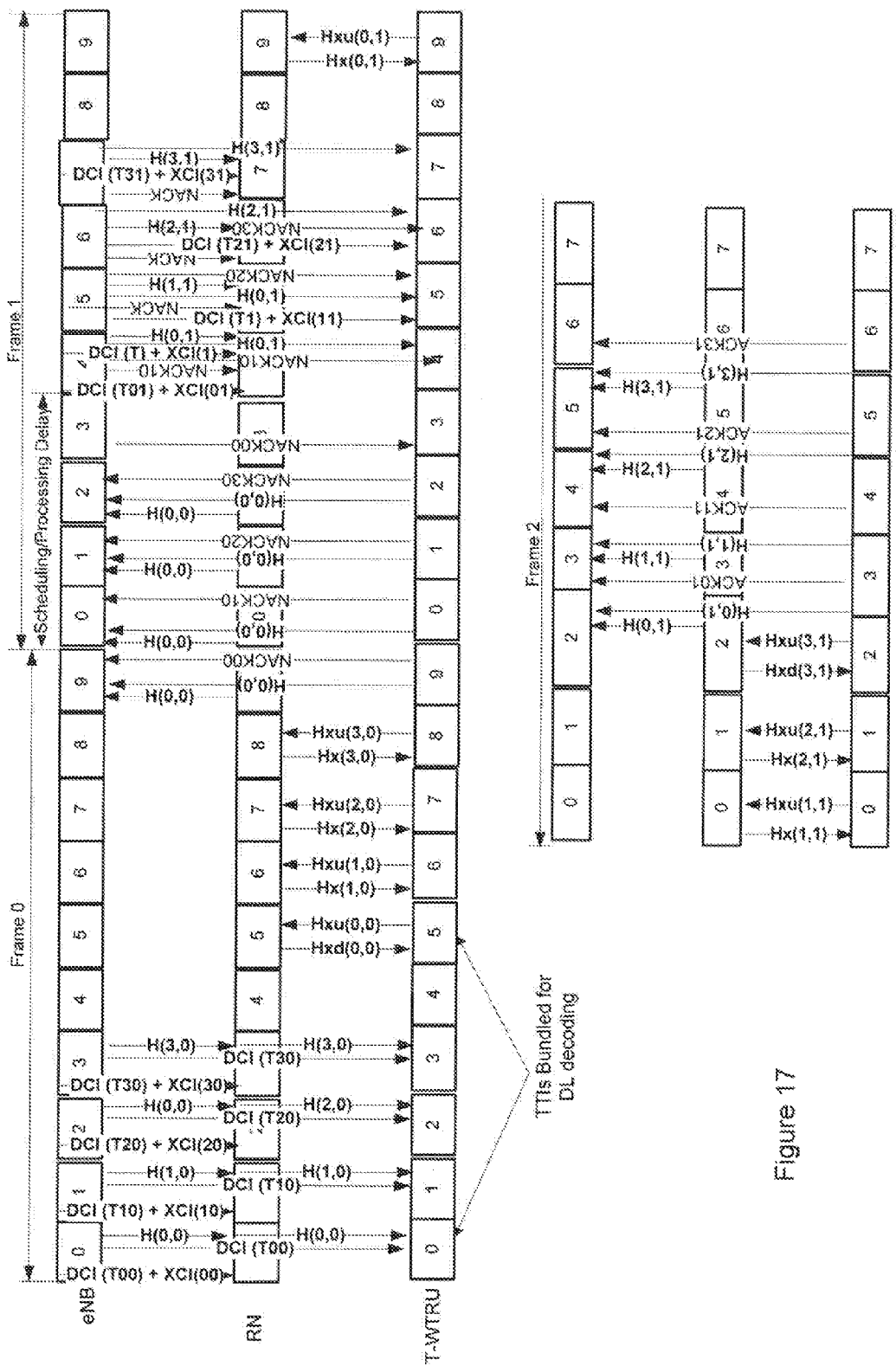
FIG. 17 illustrates an exemplary message exchange and timing for a cooperative transmission.

FIG. 17 is an exemplary illustration of a timing diagram comprising the DL and UL message exchange. A RN (e.g., helper UE) can be a full-duplex helper, i.e., can help in both the DL and UL directions, and may not be hindered by the need to reverse its polarity of operation. The RN may overhear the T-WTRU transmissions to the eNB and re-transmit a slightly modified version. Four HARQ process are shown for both the DL and UL, each operating in the manner described, i.e. the RN does not overhear or send HARQ ACK/NACK for the relayed communication. It may be seen that both the DL and UL cross-links can happen simultaneously, as shown in (f0,s5)-(f0,s8). The HARQ feedback for the DL may be sent by the T-WTRU during the same time as the second hop of the UL. The HARQ feedback for the UL may be transmitted by the eNB in conjunction with the 1st hop of the DL.

Figure 18:
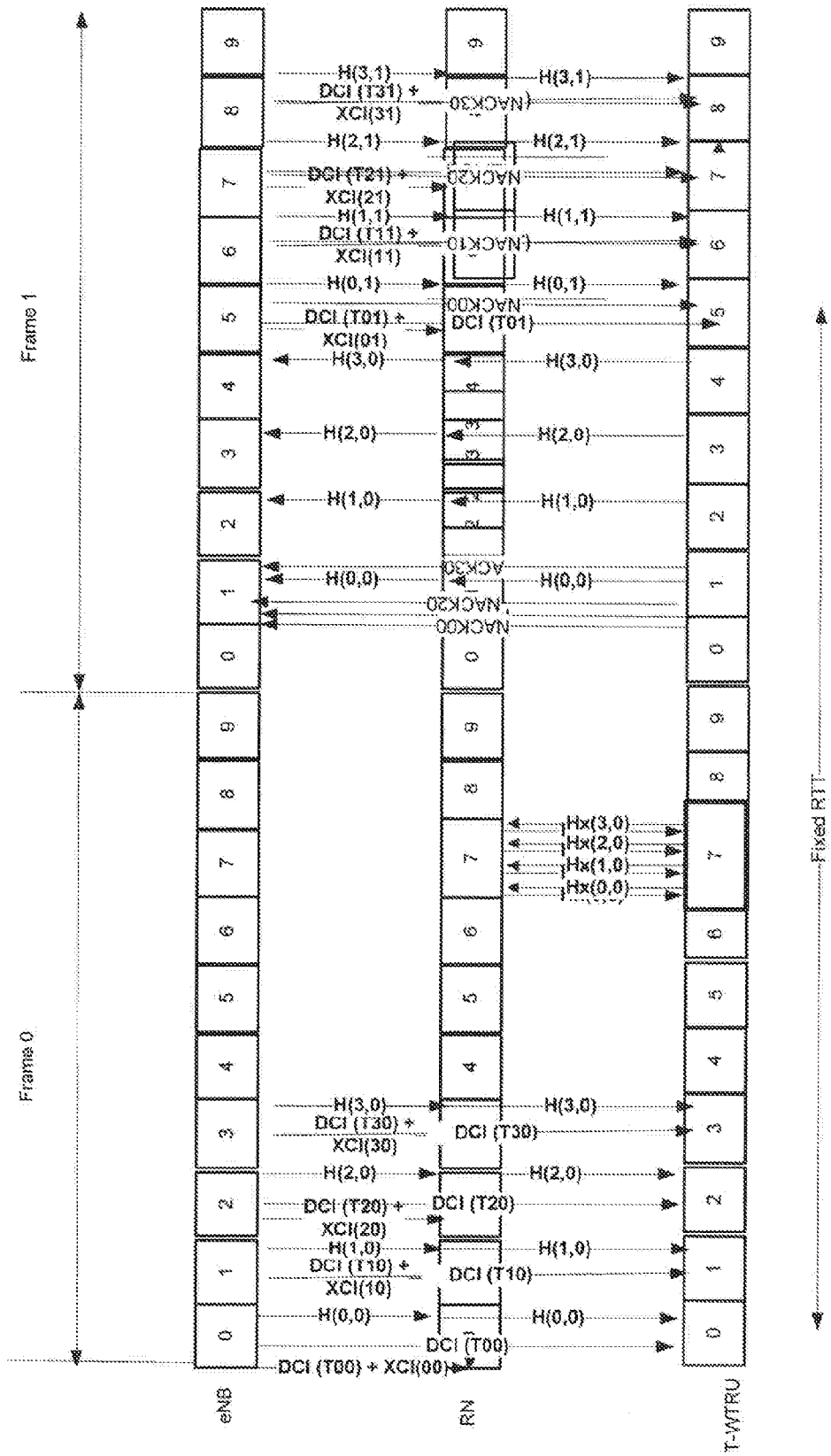
FIG. 18 illustrates an exemplary message exchange and timing for a cooperative transmission.

FIG. 18 is an exemplary illustration of a DL and UL timing example for the TDM option within FDD, with the time division occurring at the subframe granularity. The sequence is similar to that of FIG. 16, a difference being that the XL transmissions may be concentrated into one TTI (f0,s7). The entire channel may be used for XL transmission in the XL TTI. As a possible consequence, the HARQ processes may also be acknowledged by the T-WTRU in a single TTI (f1,s1), as shown in FIG. 18. The partitioning between TRL and XL subframes in this example may allow control over the fraction of overall resources 'sacrificed' for the relay function by the eNB. This configuration may allow the eNB to decide dynamically which time slots are dedicated to the relay, thus giving finer control.

Figure 19:
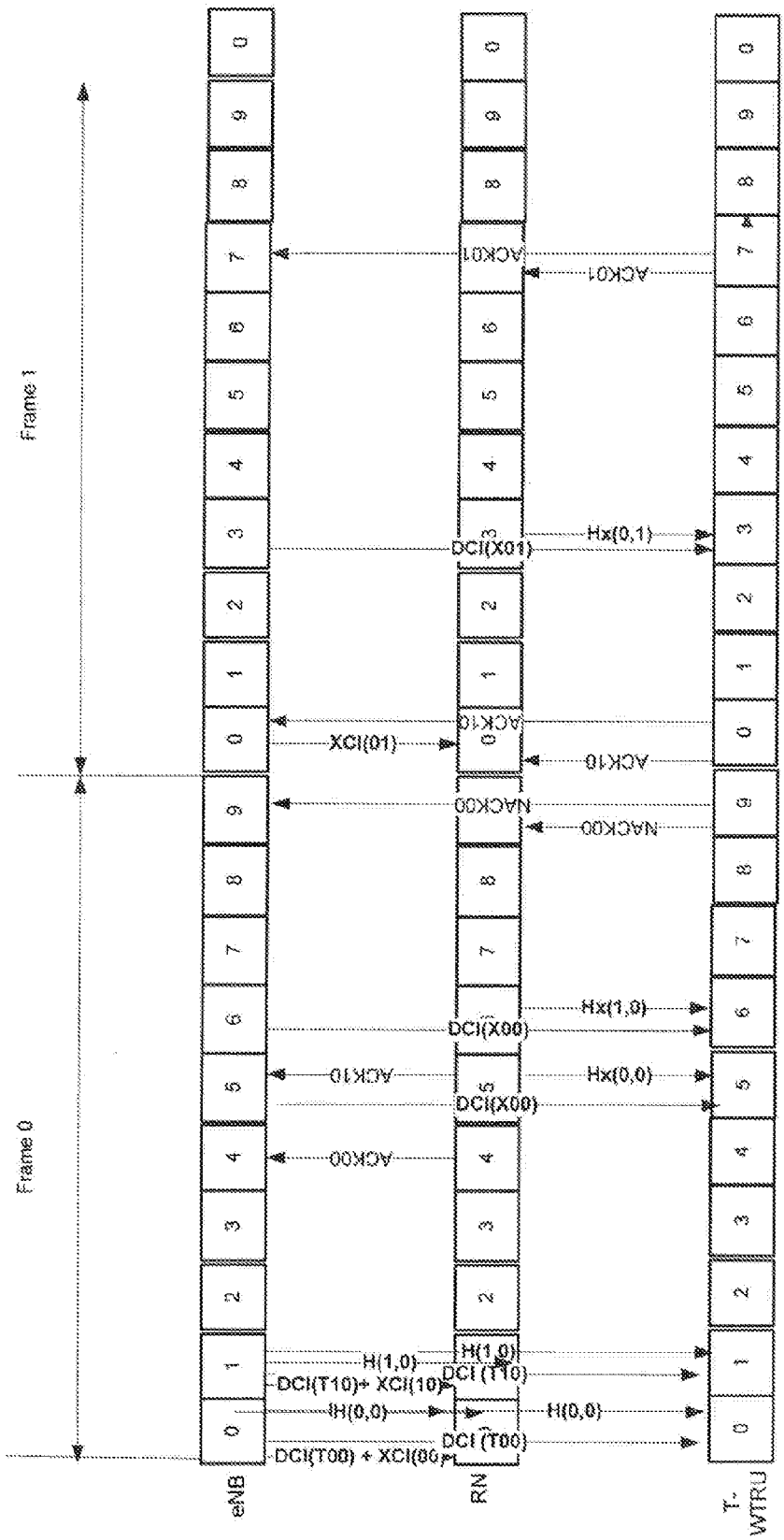
FIG. 19 illustrates an exemplary message exchange and timing for a cooperative transmission.

FIG. 19 is an exemplary illustration of symbol level TDM. In this approach, each subframe may be divided into a TRL and a XL portion at the symbol level. The single HARQ Entity approach or dual HARQ Entity approach may be used in conjunction with symbol level TDM. Here, FIG. 19 shows an example of a dual HARQ entity approach. As discussed with regard to FIG. 15 and a dual HARQ approach for FDD, the inability of the RN to reverse its Tx-Rx polarity within a TTI may impose some constraints on the HARQ scheduling. These constraints may be lifted in the symbol level TDM approach. For example, in (f0,s5), it can be seen that the T-WTRU may schedule a XL transmission to the T-WTRU, while also transmitting an acknowledgement (ACK10) to the eNB in the same TTI. Full duplex helper operation is also possible in this mode.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A wireless transmit/receive unity (WTRU), comprising:
a processor configured to:
receive a first transmission comprising first data on a first hop from an evolved NodeB (eNB),
receive a second transmission comprising second data on a second hop from a relay node,
combine and jointly decode the first data and the second data from the first and second transmissions, wherein a HARQ entity spanning across a first link between the WTRU and the eNB and a second link between the WTRU and the relay node shares a HARQ process including buffer space to enable the WTRU to combine and jointly decode the first and second data, and
send HARQ feedback for the first transmission and the second transmission.

2. The WTRU of claim 1, wherein the HARQ feedback is sent to the base station.

3. The WTRU of claim 2, wherein the HARQ feedback sent to the base station is overheard and decoded by a relay node.

4. The WTRU of claim 1, wherein the second data comprises a portion of data included in the first data.

5. The WTRU of claim 1, wherein the HARQ entity comprises a first HARQ entity for the first transmission and a second HARQ entity for the second transmission.

6. The WTRU of claim 1, wherein the HARQ entity is reserved for the first transmission signal and the second transmission signal.

7. The WTRU of claim 1, wherein the relay node is a second WTRU.

8. A method for cooperative transmission performed by, at least one of a wireless transmit/receive unit (WTRU) and an evolved Node B (eNB), the method comprising:

receiving a first transmission comprising first data on a first hop, wherein the first transmission uses a first HARQ entity;

receiving a second transmission comprising second data on a second hop, wherein the second transmission uses a second HARQ entity;

combining and jointly decoding the first data and the second data from the first and second transmissions, wherein the first and second HARQ entities are coordinated and share a HARQ process including buffer space to enable the first and second data to be combined and jointly decoded; and sending HARQ feedback for the first transmission and the second transmission.

9. The method of claim 8, wherein the second data comprises a portion of data included in the first data.

10. The method of claim 8, wherein the method is performed by a wireless transmit/receive unit.

11. The method of claim 8, wherein the method is performed by an evolved Node B.

12. A wireless transmit/receive unit (WTRU), comprising:

a processor configured to:

receive a first transmission on a first hop comprising first data at a first HARQ entity, receive a second transmission on a second hop comprising second data at a second HARQ entity, coordinate the first HARQ entity with the second HARQ entity to share a HARQ process including buffer space to enable the first data and the second data from the first and second transmissions to be combined and jointly decoded, and send HARQ feedback.

13. The WTRU in claim 12, further configured to receive downlink control information (DCI), wherein the DCI may include control information with regard to coordinating a transmission with a relay node.

14. The WTRU of claim 13, wherein the relay node receives crosslink information from a base station.

* * * * *